United States Patent
Ikedo

(10) Patent No.: US 10,785,423 B2
(45) Date of Patent: Sep. 22, 2020

(54) IMAGE SENSOR, IMAGE CAPTURING APPARATUS, AND IMAGE CAPTURING METHOD

(71) Applicant: CANON KABUSHIKI KAISHA, Tokyo (JP)

(72) Inventor: Hideki Ikedo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/205,571

(22) Filed: Nov. 30, 2018

(65) Prior Publication Data
US 2019/0182442 A1    Jun. 13, 2019

(30) Foreign Application Priority Data

Dec. 7, 2017  (JP) .................................. 2017-235207
Sep. 6, 2018  (JP) .................................. 2018-167213

(51) Int. Cl.
| H04N 5/343 | (2011.01) |
| H04N 5/345 | (2011.01) |
| H04N 5/351 | (2011.01) |
| H04N 5/353 | (2011.01) |
| H04N 5/374 | (2011.01) |
| H04N 5/367 | (2011.01) |
| H04N 5/369 | (2011.01) |
| H04N 5/232 | (2006.01) |
| H01L 27/146 | (2006.01) |
| H01L 27/148 | (2006.01) |
| H01L 31/107 | (2006.01) |

(Continued)

(52) U.S. Cl.
CPC ............. *H04N 5/343* (2013.01); *H04N 5/345* (2013.01); *H04N 5/351* (2013.01); *H04N 5/367* (2013.01); *H04N 5/37455* (2013.01)

(58) Field of Classification Search
CPC ........ H04N 5/343; H04N 5/345; H04N 5/351; H04N 5/367; H04N 5/369; H04N 5/23227; H04N 5/37452; H04N 5/37455; H04N 5/353; H04N 5/3535; H01L 27/14643; H01L 27/14806; H01L 31/107; G01S 7/4863; G01J 1/44; G01J 2201/442
USPC ....... 348/246, 294, 308, 302, 231.3, 333.02, 348/258, 285, 354, 524; 250/208.1, 250/214 A, 370.01; 257/291, 292, 186, 257/199, 481; 341/155–158
See application file for complete search history.

(56) References Cited

U.S. PATENT DOCUMENTS 4,710,817 A * 12/1987 Ando ........................ H04N 5/14
                                                        358/213.11
5,877,715 A *  3/1999 Gowda .................. H04N 5/378
                                                        341/110

(Continued)

FOREIGN PATENT DOCUMENTS

JP           61-152176 A        7/1986

*Primary Examiner* — Marly S Camargo
(74) *Attorney, Agent, or Firm* — Cowan, Liebowitz & Latman, P.C.

(57) ABSTRACT

An image sensor comprises: a plurality of pixels each including a sensor portion that generates pulses at a frequency corresponding to a frequency at which photons are incident; counters that count a number of pulses generated by each of the sensor portions; and a detector that detects whether or not a count value obtained by any of the counters has reached a first threshold. The counters are reset based on a result of detection performed by the detector.

20 Claims, 23 Drawing Sheets

(51) Int. Cl.
*G01S 7/48* (2006.01)
*G01J 1/44* (2006.01)
*H04N 5/3745* (2011.01)

(56) References Cited

U.S. PATENT DOCUMENTS

| | | | | |
|---|---|---|---|---|
| 10,277,843 B2* | 4/2019 | Smith | H04N 5/3559 | |
| | | | 348/297 | |
| 10,436,910 B2* | 10/2019 | Oggier | H04N 13/296 | |
| | | | 348/222.1 | |
| 10,491,843 B2* | 11/2019 | Ikedo | H04N 5/363 | |
| | | | 348/294 | |
| 2007/0019091 A1* | 1/2007 | Muramatsu et al. | H04N 5/335 | |
| | | | 348/164 | |
| 2009/0109315 A1* | 4/2009 | Taura | H04N 5/335 | |
| | | | 348/294 | |
| 2011/0235771 A1* | 9/2011 | Aull | H04N 5/37455 | |
| | | | 250/214 R | |
| 2012/0057059 A1* | 3/2012 | Eldesouki | H04N 5/3535 | |
| | | | 250/208.1 | |
| 2012/0075615 A1* | 3/2012 | Charbon | G01S 7/487 | |
| | | | 356/5.01 | |
| 2016/0241805 A1* | 8/2016 | Nishihara | H04N 5/37455 | |
| | | | 348/308 | |
| 2017/0131143 A1* | 5/2017 | Andreou | G01J 1/44 | |
| | | | 250/214.1 | |
| 2017/0289477 A1* | 10/2017 | Nishihara | H04N 5/37455 | |
| | | | 348/308 | |
| 2018/0343401 A1* | 11/2018 | Campbell et al. | H04N 5/369 | |
| | | | 348/294 | |

* cited by examiner

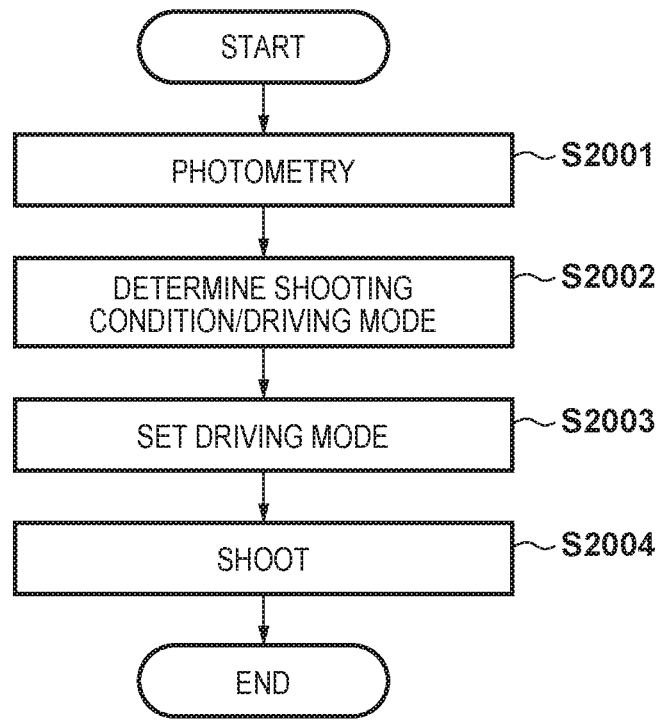
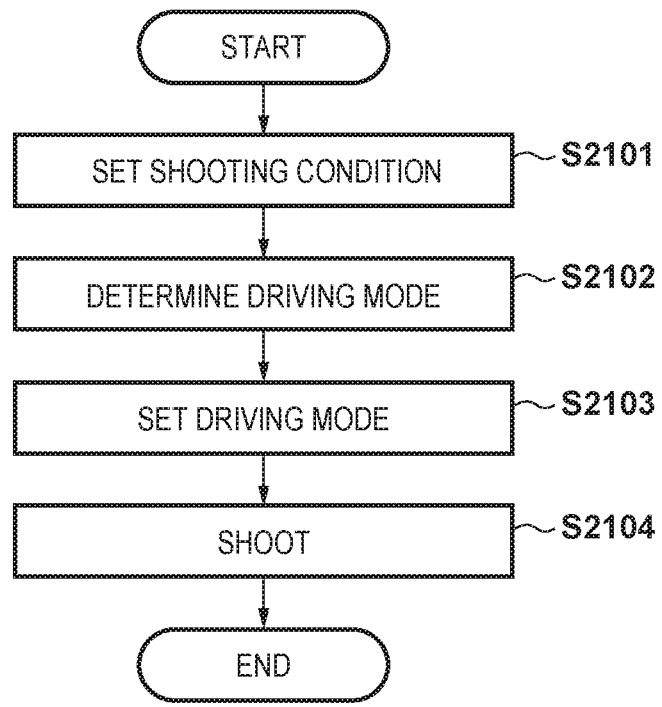

IMAGE SENSOR, IMAGE CAPTURING APPARATUS, AND IMAGE CAPTURING METHOD

BACKGROUND OF THE INVENTION

Field of the Invention

The present invention relates to an image sensor, an image capturing apparatus, and an image capturing method.

Description of the Related Art

CCD image sensors and CMOS image sensors are widely known as image sensors that use semiconductor devices. CCD image sensors and CMOS image sensors convert a light beam that enters pixels during an exposure period to electric charges using photodiodes, and output signals corresponding to the charges.

In recent years, image sensors using a photon counting method have been proposed, in which the number of photons that enter a photodiode during an exposure period is counted and a photon count value is output as a signal value. For example, Japanese Patent Laid-Open No. 61-152176 discloses a solid-state image sensor that uses an avalanche photodiode and a counter. If a reverse bias voltage that is greater than a breakdown voltage is applied to the avalanche photodiode, a carrier that is generated due to incidence of a single photon causes avalanche multiplication, and a large current flows through this avalanche photodiode. A signal that corresponds to the number of photons can be obtained by counting pulse signals each corresponds to the incidence of the single photon using the counter. An image sensor that uses the photon counting method uses the number of photons that have entered the photodiode as a signal value as-is, and is therefore less affected by noise than a CCD image sensor and a CMOS image sensor. For this reason, an image sensor that uses the photon counting method can obtain a good quality image even in an environment with poor light.

However, there is a concern that an image with favorable gradation cannot necessarily be obtained with the proposed technique.

SUMMARY OF THE INVENTION

The present invention has been made in consideration of the above situation, and provides an image sensor, an image capturing apparatus, and an image capturing method with which an image with favorable gradation can be acquired.

According to the present invention, provided is an image sensor comprising: a plurality of pixels each including a sensor portion that generates pulses at a frequency corresponding to a frequency at which photons are incident; counters that count a number of pulses generated by each of the sensor portions; and a detector that detects whether or not a count value obtained by any of the counters has reached a first threshold, wherein the counters are reset based on a result of detection performed by the detector.

Further, according to the present invention, provided is an image capturing apparatus comprising: an image sensor comprising: a plurality of pixels each including a sensor portion that generates pulses at a frequency corresponding to a frequency at which photons are incident; counters that count a number of pulses generated by each of the sensor portions; and a detector that detects whether or not a count value obtained by any of the counters has reached a threshold, the counters being reset based on a result of the detection performed by the detector; and a processor that performs predetermined processing on a signal output from the image sensor, wherein addition is performed using count values obtained by the counters, based on the result of the detection performed by the detector.

Furthermore, according to the present invention, provided is an image capturing method comprising: counting, using counters, a number of pulses generated by each of sensor portions at a frequency corresponding to a frequency at which photons are incident; and performing addition using count values obtained by the counters and resetting the counters, based on the count value obtained by any of the counters having reached a threshold.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 20 is a flowchart illustrating a flow of control of the image capturing apparatus according to the sixth embodiment.

FIG. 21 is a flowchart illustrating a flow of another control of the image capturing apparatus according to the sixth embodiment.

DESCRIPTION OF THE EMBODIMENTS

Embodiments of the present invention will be described below with reference to the drawings. Note that the present invention is not limited to the following embodiments, and may be modified as appropriate. The following embodiments may also be combined as appropriate.

First Embodiment

Figure 1:
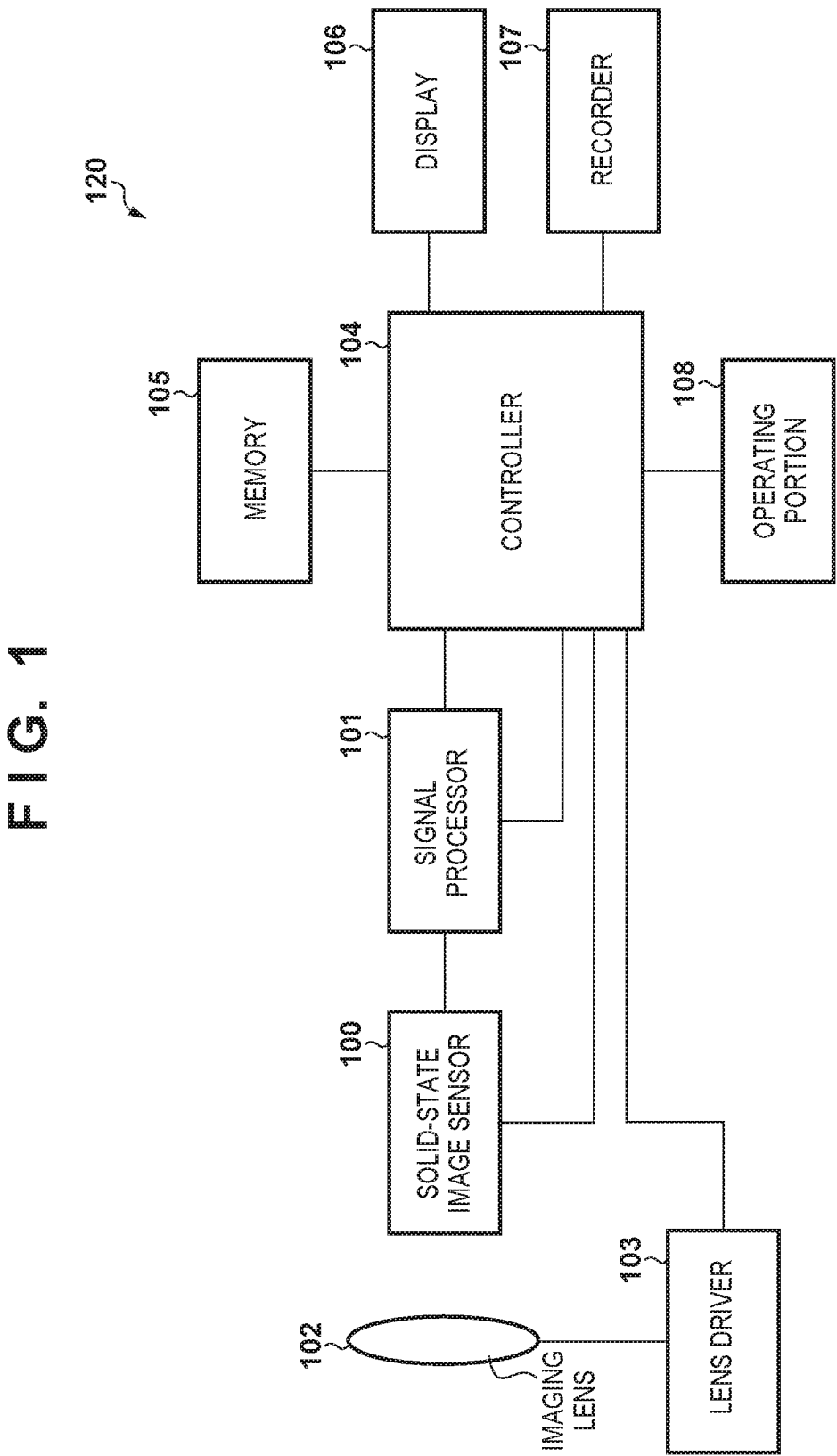
FIG. 1 is a block diagram illustrating an image capturing apparatus according to a first embodiment.

A solid-state image sensor, an image capturing apparatus, and an image capturing method according to the first embodiment will be described with reference to FIGS. 1 to 6. FIG. 1 is a block diagram illustrating an image capturing apparatus according to this embodiment. As illustrated in FIG. 1, an image capturing apparatus 120 according to this embodiment includes a solid-state image sensor 100, a signal processor 101, a lens driver 103, a controller 104, a memory 105, a display 106, a recorder 107, and an operating portion 108. The image capturing apparatus 120 also includes an imaging lens (imaging optical system, lens unit) 102. The imaging lens 102 may or may not be removable from the body (main body) of the image capturing apparatus 120.

The solid-state image sensor 100 generates an image signal by performing photoelectric conversion on an optical image of a subject that is formed by the imaging lens 102, and outputs the generated image signal. Each unit pixel 201 (see FIG. 2) provided in the solid-state image sensor 100 includes a photodiode 303 (see FIG. 3) and a counter 306 (see FIG. 3), and may count the number of incident photons and output the counted number as a signal value. In this embodiment, the count value of the counter 306 is not saturated during an exposure period. The details of this point will be described later with reference to FIGS. 2 and 3.

The imaging lens 102 causes an optical image of a subject to be formed on an imaging plane of the solid-state image sensor 100. The lens driver 103 is for driving the imaging lens 102, and performs zoom control, focus control, aperture control, and the like. The imaging lens 102 forms an optical image of a subject, and causes the formed optical image to enter the imaging plane of the solid-state image sensor 100.

The signal processor 101 performs predetermined signal processing (image processing), such as correction processing, or the like, on image signals (image data) that are output from the solid-state image sensor 100.

The controller 104 governs control of the entire image capturing apparatus 120, and performs predetermined computation processing and the like. The controller 104 outputs a control signal for driving each functional block in the image capturing apparatus 120, control data for controlling the solid-state image sensor 100, and so on. The controller 104 performs predetermined signal processing (image processing), such as development or compression, or the like, on image signals that have been subjected to signal processing or the like by the signal processor 101.

The memory 105 temporarily stores image data or the like.

The display 106 displays image signals that have been subjected to signal processing or the like by the controller 104, various kinds of setting information regarding the image capturing apparatus 120, and so on.

The recorder (recording controller) 107 includes a recording medium (not shown). This recording medium may be or may not be removable from the recorder 107. The recorder 107 records, to the recording medium, image signals that have been subjected to signal processing or the like by the controller 104. Examples of the recording medium may include a semiconductor memory such as a flash memory.

The operating portion 108 is for setting a shooting mode, an accumulation period, and so on, and accepts operations input by a user. The operating portion 108 is constituted by a button, a dial, or the like, for example. If the display 106 is a touch panel, this touch panel is also included in the operating portion 108.

Figure 2:
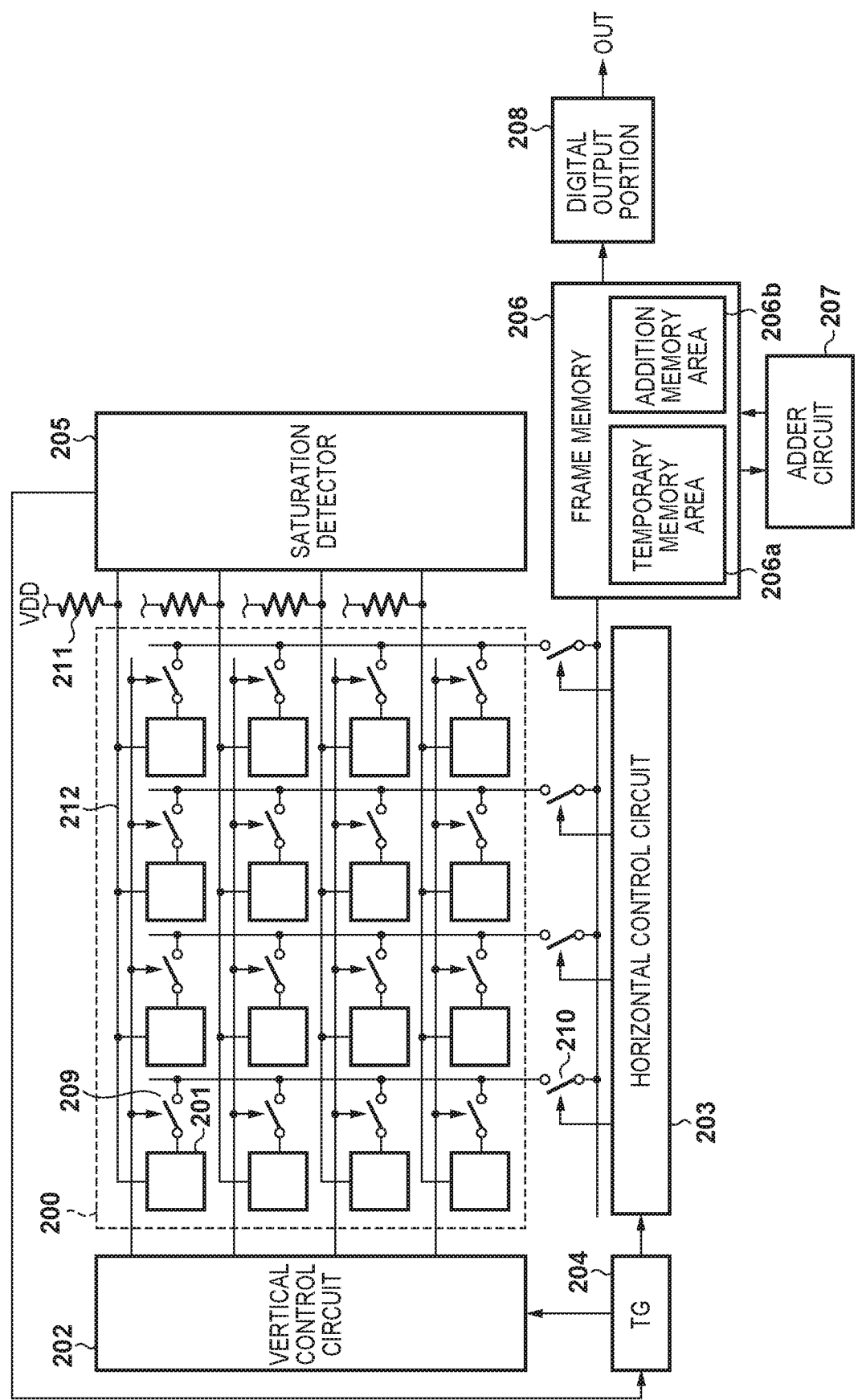
FIG. 2 illustrates a solid-state image sensor according to the first embodiment.

FIG. 2 illustrates the solid-state image sensor according to this embodiment. As illustrated in FIG. 2, the solid-state image sensor 100 includes a pixel array 200, a vertical control circuit 202, a horizontal control circuit 203, a timing generator (TG) 204, a saturation detector 205, a frame memory 206, an adder circuit 207, and a digital output portion 208.

A plurality of unit pixels (pixels) 201 are arranged in a matrix in the pixel array (pixel array area) 200. An arrangement of 4×4 unit pixels 201 is shown here to simplify the description, but in practice, a large number of unit pixels 201 are arranged in the pixel array 200. Each unit pixel 201 can count photons that have entered the unit pixel 201, and output a digital signal obtained by thus counting the photons. The details of this point will be described later with reference to FIG. 3.

The saturation detector 205 detects that a photon count value has reached a predetermined threshold Cth during an exposure period, in any of the plurality of unit pixels 201 provided in the pixel array 200. Upon detecting that the photon count value has reached the threshold Cth in any of the plurality of unit pixels 201, the saturation detector 205 supplies the timing generator 204 with information indicating this detection.

A unit pixel 201 in which the photon count value has reached the threshold Cth outputs a threshold-reach signal PSAT (see FIG. 3), which is a signal indicating that the photon count value obtained by counting photons has reached the threshold Cth, to the saturation detector 205 via an interconnect 212. The threshold-reach signal PSAT is transmitted to the saturation detector 205 via the shared interconnect 212, which is provided for each row. A pull-up resistor 211 is connected to each interconnect 212. One end of the pull-up resistor 211 is connected to the corresponding interconnect 212, and the other end of the pull-up resistor 211 is connected to a power supply voltage VDD.

Although a description has been given here of an exemplary case where the threshold-reach signal PSAT is output to the saturation detector 205 via the shared interconnect 212 that is provided for each line, this may not necessarily be the case. For example, the threshold-reach signal PSAT may be transmitted to the saturation detector 205 via a shared interconnect that is provided for each column. Alternatively, the threshold-reach signal PSAT may be output to the saturation detector 205 via an interconnect that is shared by all unit pixels 201.

Upon the threshold-reach signal PSAT being supplied to the saturation detector 205 during an exposure period, the saturation detector 205 detects this threshold-reach signal PSAT, and transmits, to the timing generator 204, a signal indicating that the saturation detector 205 has detected a threshold-reach signal PSAT. Upon receiving, from the saturation detector 205, a signal indicating that a threshold-reach signal PSAT has been detected, the timing generator 204 supplies a control signal for causing each unit pixel 201 to output a pixel signal, to the vertical control circuit 202 and the horizontal control circuit 203. Note that the timing generator 204 supplies the control signal to the frame memory 206, the adder circuit 207, and the digital output portion 208, via an interconnect (not shown).

The vertical control circuit 202 selects, row-by-row, a plurality of unit pixels 201 provided in the pixel array 200, using a switch 209. The vertical control circuit 202 supplies, for each row, a control signal to the plurality of unit pixels 201 provided in the pixel array 200 via an interconnect (not shown). The details of the control signal will be described later with reference to FIG. 3.

The horizontal control circuit 203 selects, column-by-column, a plurality of unit pixels 201 provided in the pixel array 200, using a switch 210.

A pixel signal from the unit pixel 201 that is sequentially selected based on the combination of the vertical control circuit 202 and the horizontal control circuit 203 is held in the frame memory 206.

The frame memory 206 holds a digital pixel signal that is output from each unit pixel 201. The frame memory 206 includes a temporary memory area 206a and an addition memory area 206b.

The temporary memory area 206a temporarily holds the digital pixel signal that is output from each unit pixel 201. The addition memory area 206b adds pixel signals from the same address (from the same pixel) that are held in the temporary memory area 206a during an exposure period, and holds a pixel signal obtained by this addition. The bit width of a pixel signal (data) held in the temporary memory area 206a can be made equal to the bit width of a digital pixel signal that is output from each unit pixel 201. Meanwhile, the bit width of a pixel signal that is held in the addition memory area 206b is sufficiently greater than the bit width of a digital pixel signal that is output from each unit pixel 201.

The adder circuit 207 adds a pixel signal held in the addition memory area 206b in the frame memory 206 and a pixel signal newly held in the temporary memory area 206a in the frame memory 206. The adder circuit 207 performs this addition processing for each address (for each pixel). The pixel signal obtained through the addition performed by the adder circuit 207 is held in the addition memory area 206b. The pixel signal held in the addition memory area 206b is thus updated.

The digital output portion 208 outputs the pixel signal (image signal) held in the addition memory area 206b in the frame memory 206, to the outside of the solid-state image sensor 100.

Although a description has been given here of an exemplary case where the frame memory 206 and the adder circuit 207 are provided in the solid-state image sensor 100, this may not necessarily be the case. The frame memory 206 and the adder circuit 207 may be provided outside the solid-state image sensor 100.

Figure 3:
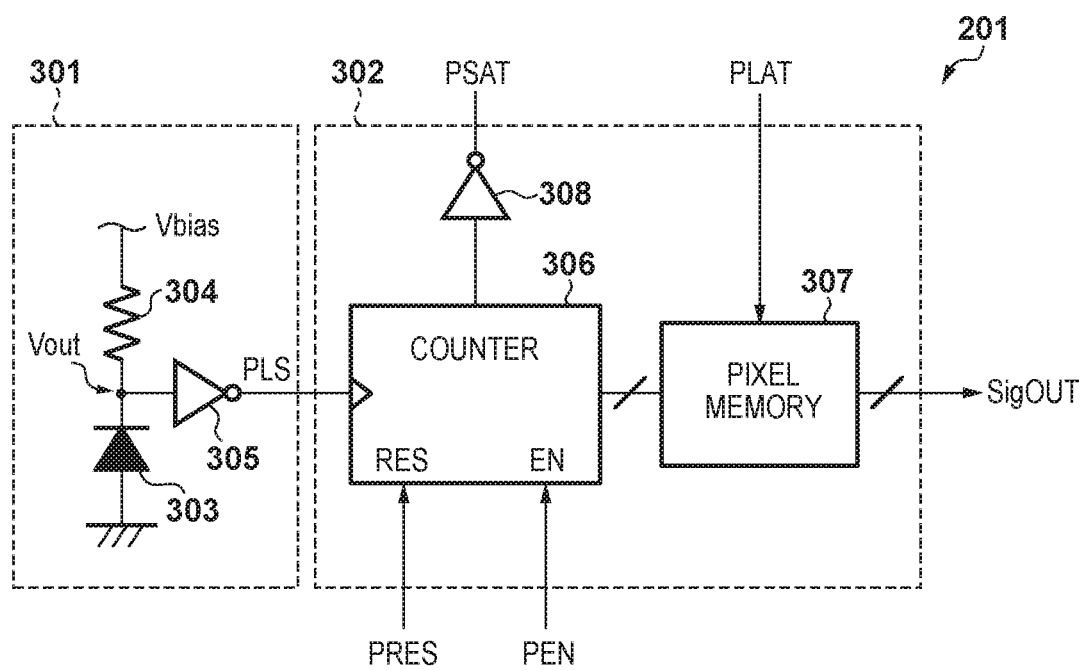
FIG. 3 illustrates a unit pixel that is provided in the solid-state image sensor according to the first embodiment.

FIG. 3 illustrates a unit pixel provided in the solid-state image sensor according to this embodiment. As illustrated in FIG. 3, the unit pixel 201 includes a sensor portion (light receiving portion) 301 and a counter portion 302. The sensor portion 301 includes a photodiode 303, a quenching resistor 304, and an inverting buffer 305. The photodiode 303 is an avalanche photodiode. An anode of the photodiode 303 is connected to a ground potential, and a cathode of the photodiode 303 is connected to one end of the quenching resistor 304. A bias voltage (reverse bias voltage) Vbias is applied to the other end of the quenching resistor 304. The bias voltage Vbias, which is greater than or equal to the breakdown voltage of the photodiode 303, is applied to the photodiode 303 via the quenching resistor 304. For this reason, the photodiode 303 operates in a Geiger mode. That is to say, an incidence of a photon on the photodiode 303 causes an avalanche multiplication phenomenon. An avalanche current is thus generated, and a voltage drop occurs at the quenching resistor 304. The quenching resistor 304 is a resistor element for stopping the avalanche multiplication phenomenon in the photodiode 303. The quenching resistor 304 may be configured using a resistance component of a transistor. If an avalanche current occurs due to the avalanche multiplication phenomenon in the photodiode 303, a voltage drop occurs at the quenching resistor 304, and a reverse bias voltage applied to the photodiode 303 drops. Upon the reverse bias voltage dropping to the breakdown voltage, the avalanche multiplication phenomenon stops. As a result, the avalanche current no longer flows, and the bias voltage Vbias is again applied to the photodiode 303. The inverting buffer 305 is provided to extract a voltage change that has occurred at the quenching resistor 304, as a pulse signal PLS. Upon a photon entering the photodiode 303, a pulse signal PLS is output from the inverting buffer 305. Thus, a pulse is generated from the sensor portion 301 at a frequency corresponding to the frequency at which a photon is received.

Figure 4:
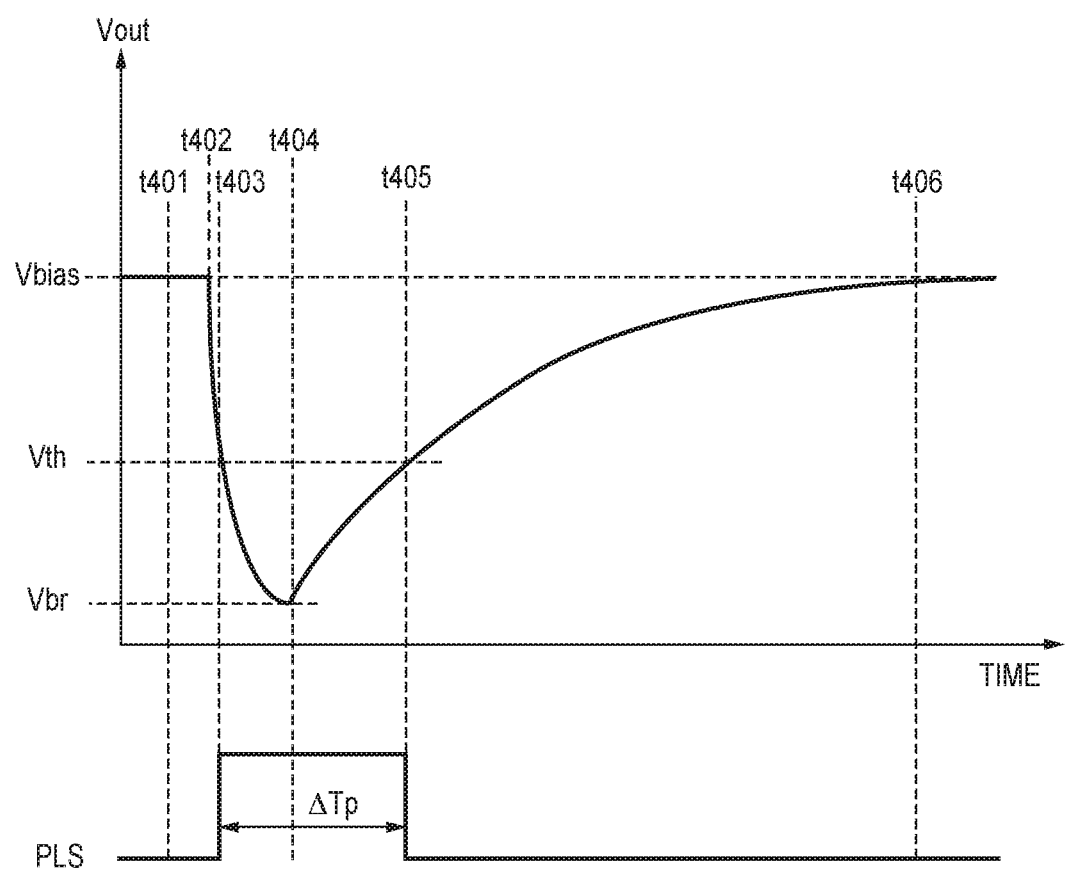
FIG. 4 illustrates operations of a sensor portion.

Operations of the sensor portion 301 will now be described with reference to FIG. 4. FIG. 4 illustrates operations of the sensor portion 301. FIG. 4 illustrates a temporal change in a cathode terminal voltage Vout when a photon enters the photodiode 303, and a temporal change in the pulse signal PLS that is output from the inverting buffer 305. The horizontal axis in FIG. 4 indicates time. The cathode terminal voltage Vout also indicates the reverse bias voltage that is applied to the photodiode 303.

At timing t401, the bias voltage Vbias that is greater than or equal to the breakdown voltage Vbr is applied to the photodiode 303. For this reason, the photodiode 303 operates in the Geiger mode.

At timing t402, upon a photon entering the photodiode 303, a carrier that is generated in the photodiode 303 causes an avalanche multiplication phenomenon, and an avalanche current occurs. This avalanche current starts lowering the cathode terminal voltage Vout at the photodiode 303 that is connected to the quenching resistor 304.

At timing t403, the cathode terminal voltage Vout at the photodiode 303 decreases to a threshold Vth, and thereafter, the cathode terminal voltage Vout at the photodiode 303 continues to decrease further. At timing t403, at which the cathode terminal voltage Vout at the photodiode 303 decreases to the threshold Vth, the pulse signal PLS output from the inverting buffer 305 switches from an L level to a H level.

At timing t404, the cathode terminal voltage Vout at the photodiode 303 decreases to the breakdown voltage Vbr. After the cathode terminal voltage Vout at the photodiode 303 has decreased to the breakdown voltage Vbr, the avalanche multiplication phenomenon stops. Then, the photodiode 303 is recharged via the quenching resistor 304 from a power supply that is supplying the bias voltage Vbias, and thus, the cathode terminal voltage Vout at the photodiode 303 starts increasing.

At timing t405, the cathode terminal voltage Vout at the photodiode 303 increases to the threshold Vth. At timing t405 at which the cathode terminal voltage Vout at the photodiode 303 reaches the threshold Vth, the pulse signal PLS output from the inverting buffer 305 switches from the H level to the L level.

Thereafter, at timing t406, the recharging is completed. At the stage where the recharging is completed, the cathode terminal voltage Vout at the photodiode 303 has returned to the bias voltage Vbias. Note that the time required for the recharging depends on the resistance value and the parasitic capacitance of the quenching resistor 304. Thus, as a result of a photon entering once, one pulse signal PLS with a pulse width ΔTp is output from the sensor portion 301.

As illustrated in FIG. 3, the counter portion 302 includes the counter (counter circuit) 306, a pixel memory 307, and an inverting buffer 308.

The pulse signal PLS, which is generated as a result of a photon entering the sensor portion 301, is input to the counter 306, and the counter 306 counts the number of times that the pulse signal PLS changes from the L level to the H level, as the number of pulses. A pulse count value obtained by the counter 306 serves as a pixel signal. The counter 306 has an enable control terminal EN for switching between a pulse counting state and a non-pulse counting state. The counter 306 also has a reset terminal RES for resetting the counter 306. The enable control terminal EN of the counter 306 is supplied with an enable signal PEN from the vertical control circuit 202. The reset terminal RES of the counter 306 is supplied with a reset signal PRES from the vertical control circuit 202. If the pulse signal PLS changes from the L level to the H level with the enable signal PEN supplied to the counter 306 being at the H level, the count value of the counter 306 increases by one at a time. In a state where the enable signal PEN is at the L level, the count value of the counter 306 does not increase even if the pulse signal PLS changes from the L level to the H level. Upon the reset signal PRES supplied to the counter 306 changing from the L level to the H level, the count value of the counter 306 is reset to 0.

The pixel memory 307 temporarily holds the count value, which is a pixel signal that has been counted by the counter 306. The pixel memory 307 is supplied with a latch signal PLAT from the vertical control circuit 202. Upon the latch signal PLAT changing from the L level to the H level, the pixel memory 307 fetches the count value of the counter 306 and holds the fetched count value. The count value fetched by the pixel memory 307 is used as a pixel signal.

The count value (pixel signal) that is held in the pixel memory 307 in the unit pixel 201 selected by the vertical control circuit 202 and the horizontal control circuit 203 is transmitted to the frame memory 206.

In this embodiment, the enable signal PEN, the reset signal PRES, and the latch signal PLAT are simultaneously supplied from the vertical control circuit 202 to all unit pixels 201 provided in the pixel array 200.

The counter 306 includes a comparator circuit (not shown). If the count value is greater than or equal to the predetermined threshold Cth, the counter 306 outputs the threshold-reach signal PSAT, which is a signal indicating that the count value is greater than or equal to the threshold Cth, via the inverting buffer 308, which is an open-drain output buffer. In a state where the count value is smaller than the threshold Cth, the threshold-reach signal PSAT, which is output from the counter 306 via the inverting buffer 308, is at the high level (H level). On the other hand, if the count value is greater than or equal to the threshold Cth, the threshold-reach signal PSAT, which is output from the counter 306 via the inverting buffer 308, is at a low level (L level). As mentioned above, the threshold-reach signals PSAT that are output from the unit pixels 201 that are located in the same row are output via the shared interconnect 212. The interconnect 212 is pulled up by the pull-up resistor 211. Accordingly, the threshold-reach signal PSAT that is output from each unit pixel 201 is wired-OR connected.

If the count value is smaller than the threshold Cth in all of the plurality of unit pixels 201 located in the same row, the threshold-reach signal PSAT that is supplied to the saturation detector 205 via the interconnect 212 is at the H level. On the other hand, if the count value is greater than or equal to the threshold Cth in any of the plurality of unit pixels 201 located in the same row, the threshold-reach signal PSAT that is supplied to the saturation detector 205 via the interconnect 212 is at the L level. The saturation detector 205 is supplied with the threshold-reach signals PSAT from all rows. Thus, the saturation detector 205 can detect that the count value is greater than or equal to the threshold Cth in any of the plurality of unit pixels 201 provided in the pixel array 200.

Figure 5:
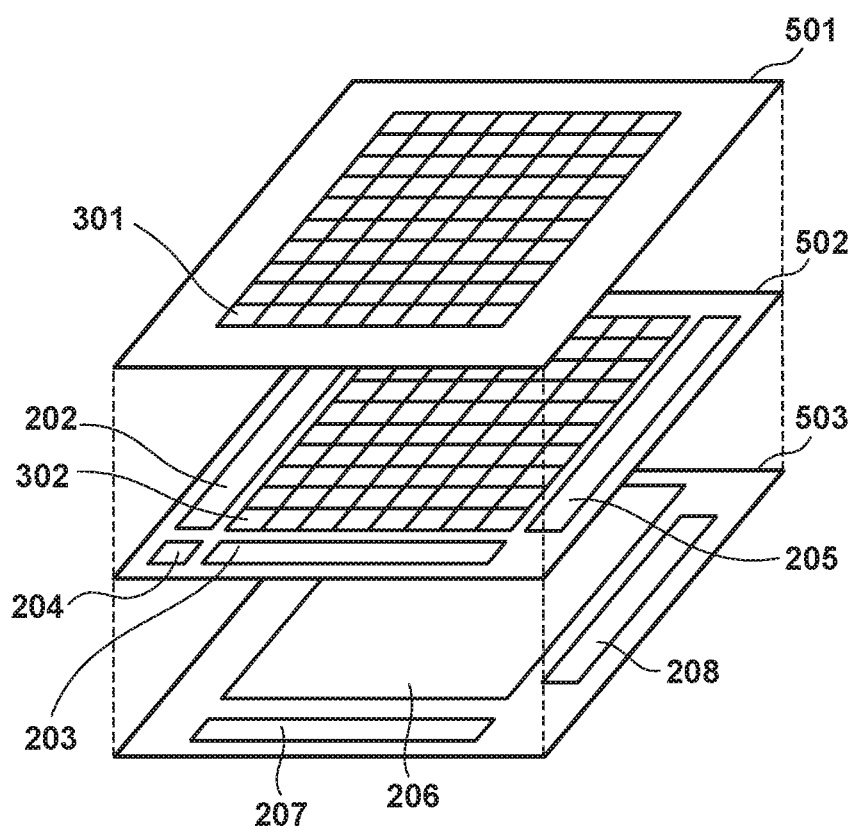
FIG. 5 illustrates an example of a layout of the solid-state image sensor according to the first embodiment.

FIG. 5 illustrates an example of a layout of the solid-state image sensor 100 according to this embodiment. The solid-state image sensor 100 is configured by stacking a sensor portion substrate 501, in which a plurality of sensor portions 301 are arranged in a matrix, a counter portion substrate 502, in which a plurality of counter portions 302 are arranged in a matrix, and a frame memory substrate 503, in which the frame memory 206 is arranged. Electrodes (not shown) provided in the sensor portion substrate 501 and electrodes (not shown) in the counter portion substrate 502 are electrically connected to each other. The electrodes (not shown) provided in the counter portion substrate 502 and electrodes (not shown) provided in the frame memory substrate 503 are electrically connected to each other. Thus, pulse signals PLS output from the sensor portions 301 provided in the sensor portion substrate 501 are input to the counter portions 302 provided in the counter portion substrate 502. The counter portion substrate 502 includes the vertical control circuit 202, the horizontal control circuit 203, the timing generator 204, and the saturation detector 205. The frame memory substrate 503 includes the frame memory 206, the adder circuit 207, and the digital output portion 208. Since the sensor portions 301 and the counter portions 302 are provided in separate substrates, a wide area can be secured for the sensor portions 301. Also, if the frame memory substrate 503 is manufactured through a finer process than manufacturing processes for the sensor portion substrate 501 and the counter portion substrate 502, data with a sufficiently large bit width can be recorded in the frame memory 206. Note that the configuration of the solid-state image sensor 100 is not limited to the above-described configuration. For example, the sensor portions 301 and the counter portions 302 may be provided in the same substrate.

Figure 6:
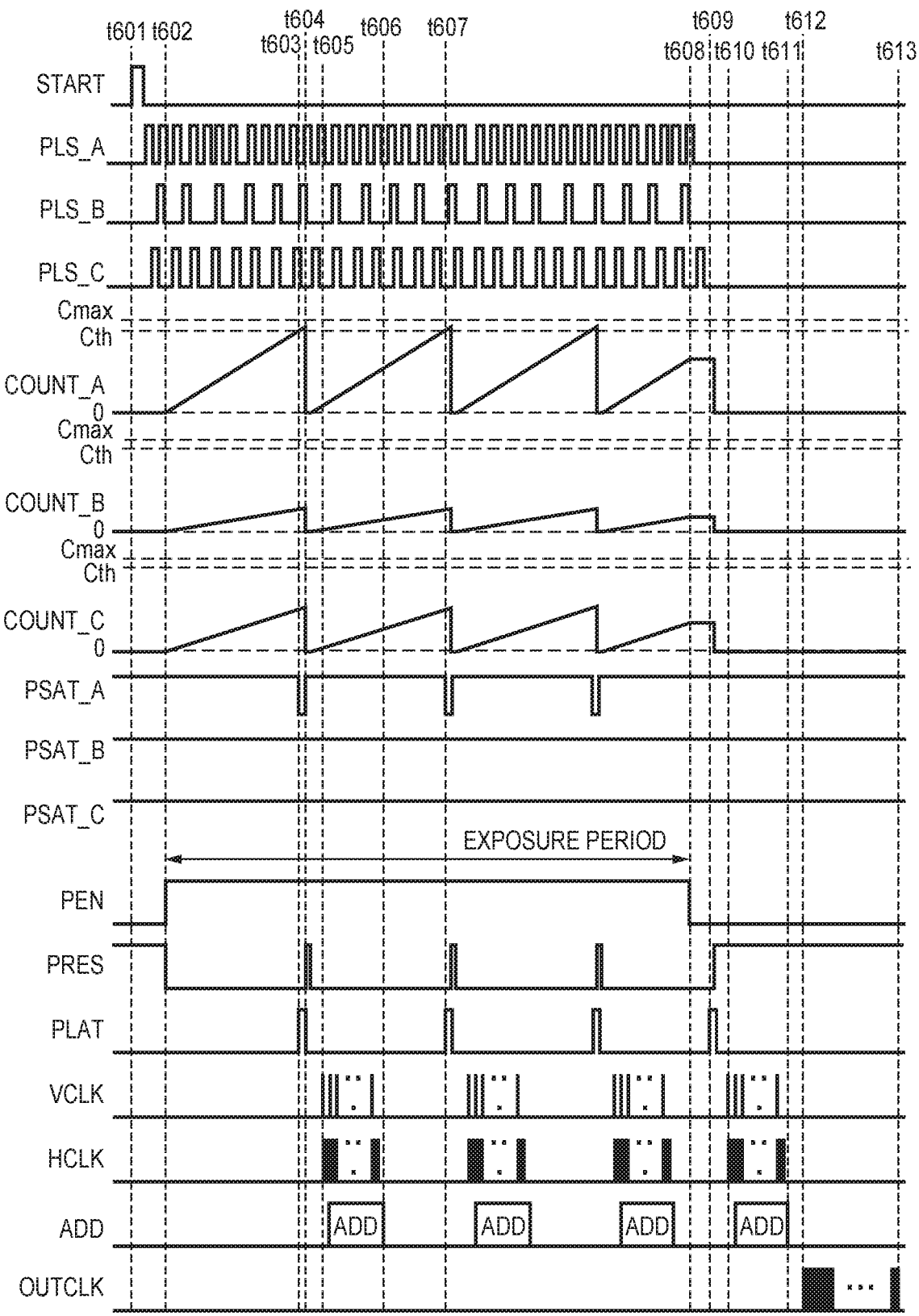
FIG. 6 is a timing chart illustrating an example of operations of the solid-state image sensor according to the first embodiment.

FIG. 6 is a timing chart illustrating an example of operations of the solid-state image sensor according to this embodiment. A description will be given here of an exemplary case where an image of one of a plurality of frames that constitute a moving image is acquired, but this may not necessarily be the case.

At timing t601, upon a shooting start instruction being given by a user or the like through the operating portion 108, the controller 104 supplies a shooting start signal START, which is a pulse-shaped signal, to the solid-state image sensor 100. Upon the shooting start signal START switching to the H level, the timing generator 204 supplies the bias voltage Vbias to the sensor portion 301. Upon the bias voltage Vbias being supplied to the sensor portion 301, a reverse bias voltage that is greater than or equal to the breakdown voltage of the photodiode 303 is applied to the photodiode 303, and the photodiode 303 then operates in the Geiger mode. Thus, the sensor portion 301 outputs the pulse signal PLS responding to a photon that enters the photodiode 303. FIG. 6 shows pulse signals PLS_A, PLS_B, and PLS_C, which are output respectively from the sensor portions 301 in three arbitrary unit pixels 201, namely unit pixels A, B, and C, out of the plurality of unit pixels 201 provided in the pixel array 200. Here, a description will be given of an exemplary case where the number of photons that enter the unit pixel A is greater than the number of photons that enter the unit pixel C, and the number of photons that enter the unit pixel C is greater than the number of photons that enter the unit pixel B.

Count values COUNT_A, COUNT_B, and COUNT_C shown in FIG. 6 are count values that are obtained by the counters 306 in the unit pixels A, B, and C, respectively. Each counter 306 can count from a count lower limit value 0 to a count upper limit value Cmax. If the count value of each counter 306 is greater than or equal to the threshold Cth, the threshold-reach signal PSAT, which is output from the unit pixel 201 that includes the counter 306 whose count value is greater than or equal to the threshold Cth, changes from the H level to the L level. Thus, the potential of the interconnect 212 provided for the row in which this unit pixel 201 is located changes from the H level to the L level. The threshold-reach signal PSAT that has changed from the H level to the L level is detected by the saturation detector 205. Threshold-reach signals PSAT_A, PSAT_B, and PSAT_C are the threshold-reach signals PSAT from the rows in which the respective unit pixels A, B, and C are provided.

At timing t601, the reset signal PRES is at the H level. Also, at timing t601, the counter 306 in each unit pixel 201 is reset to 0.

At timing t602, the timing generator 204 simultaneously supplies an L-level reset signal PRES to all rows in the pixel array 200. Thus, the reset of the counters 306 in all unit pixels 201 provided in the pixel array 200 is released. The timing generator 204 supplies an H-level enable signal PEN to all rows in the pixel array 200. Thus, the counters 306 in all unit pixels 201 provided in the pixel array 200 enter an enabled state, and the count value of the counter 306 in each unit pixel 201 increases in accordance with the input pulse signal PLS. Thus, shooting for one of the plurality of frames that constitute a moving image starts. Thereafter, counting for this frame is continued until timing t608 at which the enable signal PEN changes to the L level. Accordingly, the period from timing t602 to timing t608 corresponds to an exposure period. Since the frequency at which photons enter is highest in the unit pixel A, the increase rate of the count value COUNT_A is highest.

At timing t603, upon the count value COUNT_A reaching the threshold Cth, the threshold-reach signal PSAT_A from the row in which the unit pixel A is provided switches to the L level. The saturation detector 205, upon detecting that the threshold-reach signal PSAT from any of the rows has changed to the L level, transmits a signal indicating that the threshold-reach signal PSAT has been detected, to the timing generator 204. Upon receiving the signal indicating that the threshold-reach signal PSAT has been detected, the timing generator 204 operates as follows. That is to say, the timing generator 204 supplies a control signal to the vertical control circuit 202 so that the latch signals PLAT supplied from the vertical control circuit 202 to all unit pixels 201 simultaneously switch to the H level. Thus, the count value of the counter 306 provided in each unit pixel 201 is held by the pixel memory 307 that corresponds to the counter 306.

At timing t604, upon the reset signal PRES switching to the H level, the count value of the counter 306 in each unit pixel 201 is reset to 0. Upon the reset signal PRES being restored to the L level, the reset of the counter 306 is released, and the counter 306 in each unit pixel 201 resumes counting in accordance with incident photons. Also, as a result of the count value in the unit pixel A having been restored to 0, the threshold-reach signal PSAT_A returns to the H level from the L level.

At timing t605, the supply of a signal VCLK from the timing generator 204 to the vertical control circuit 202 is started. Every time the signal VCLK switches to the H level, the switches 209 in each row sequentially turn on, and the vertical control circuit 202 selects the plurality of unit pixels 201 provided in the pixel array 200 row-by-row. Upon any row being selected by the vertical control circuit 202, a signal HCLK is supplied from the timing generator 204 to the horizontal control circuit 203, and the switches 210 for respective columns are sequentially turned on. Thus, the count values (pixel signals) held in the pixel memories 307 in the unit pixels 201 in the selected row are sequentially stored in the temporary memory area 206a of the frame memory 206. The adder circuit 207 adds a pixel signal held in the temporary memory area 206a in the frame memory 206 and a pixel signal of the same address held in the addition memory area 206b in the frame memory 206. Then, the adder circuit 207 again stores the pixel signal obtained by the addition, in the addition memory area 206b. Note that the addition processing is performed by the adder circuit 207 in parallel with the holding of the pixel signals in the frame memory 206. During the addition processing performed in the period from timing t605 to timing t606, i.e. the first addition processing, no pixel signal is held in the addition memory area 206b in the frame memory 206. For this reason, the pixel signal that is output from each unit pixel 201 and stored in the temporary memory area 206a is held, as-is, in the addition memory area 206b.

At timing t607, upon the count value COUNT_A again reaching the threshold Cth, the threshold-reach signal PSAT_A switches to the L level. Then, the pixel signal from each unit pixel 201 is stored in the temporary memory area 206a in the frame memory 206, similarly to timings t603 to t606. The pixel signal stored in the temporary memory area 206a and the pixel signal held in the addition memory area 206b are added, and the pixel signal obtained by the addition is stored in the addition memory area 206b. Thereafter, the above-described processing is repeated every time the count value in any of the unit pixels 201 reaches the threshold Cth during the exposure period.

As described above, in the period from timing t605 to timing t606, the count value (pixel signal) held in the pixel memory 307 in each unit pixel 201 is sequentially stored in the temporary memory area 206a in the frame memory 206. It is favorable that the processing to store the count value that is held in the pixel memory 307 in each unit pixel 201, in the temporary memory area 206a in the frame memory 206 has been completed before timing t607 at which the count value in the unit pixel 201 again reaches the threshold Cth. If it is assumed that the pulse width of the pulse signal PLS is ΔTp, the minimum time taken until the count value reaches the threshold Cth from 0 is ΔTp×Cth. It is therefore favorable to set the frequency of the signals VCLK and HCLK so that the processing to store the count value of each unit pixel 201 in the temporary memory area 206a in the frame memory 206 is completed within a time period shorter than (ΔTp×Cth). Alternatively, the threshold Cth for the counter 306 may be set so that the time required for the processing to store the count value of each unit pixel 201 in the temporary memory area 206a in the frame memory 206 is longer than (ΔTp×Cth).

At timing t608, after the exposure period has ended, the enable signal PEN switches to the L level. Thus, the counter 306 in each unit pixel 201 enters a disabled state, and the count value no longer increases even if the pulse signal PLS is input to the counter 306. Also, the bias voltage Vbias stops being supplied to the sensor portion 301, and the sensor portion 301 no longer outputs the pulse signal PLS.

Thereafter, the timing generator 204 performs the following processing to store the count value of the counter 306 at the end of exposure in the frame memory 206. That is to say, at timing t609, the timing generator 204 changes the latch signal PLAT from the L level to the H level. Upon the latch signal PLAT changing from the L level to the H level, the pixel memory 307 fetches the count value of the counter 306 and holds the fetched count value. Thereafter, the latch signal PLAT supplied from the timing generator 204 is returned to the L level from the H level. The timing generator 204 also switches the reset signal PRES to the H level to reset the count value of the counter 306 to 0.

In the period from timing t610 to timing t611, the pixel signal of each unit pixel 201 is held in the temporary memory area 206a in the frame memory 206, similarly to the period from timing t605 and timing t606. The pixel signal obtained through the addition processing by the adder circuit 207 is held in the addition memory area 206b in the frame memory 206. The pixel signal held in the addition memory area 206b is a signal obtained as a result of the adder circuit 207 adding the pixel signals acquired from the pixel memory 307 during the exposure period from timing t602 to timing t608. The pixel signal that is thus obtained is a signal that corresponds to the number of photons that have entered during the exposure period. As described above, according to this embodiment, the count value of each counter 306 can be prevented from being saturated during the exposure period.

There may also be the case where timing t608, at which exposure ends, is reached while a pixel signal held in the pixel memory 307 is sequentially transmitted to the temporary memory area 206a in the frame memory 206. In such case, the count value of the counter 306 at the end of exposure may be stored in the pixel memory 307 after the pixel signal held in the pixel memory 307 in each unit pixel 201 has finished being stored in the temporary memory area 206a in the frame memory 206.

In the period from timing t612 to timing t613, a control signal OUTCLK is supplied from the timing generator 204 to the digital output portion 208. As a result, the pixel signals held in the addition memory area 206b in the frame memory 206, i.e. the pixel signals obtained through addition during the exposure period, are sequentially output to the outside of the solid-state image sensor 100 via the digital output portion 208. Upon completion of the output of the pixel signals to the outside of the solid-state image sensor 100, the pixel signals held in the addition memory area 206b in the frame memory 206 are reset to 0.

As described above, in this embodiment, count values are acquired and the reset operation is performed every time the count value of the counter 306 in any of the unit pixels 201 reaches the threshold Cth. For this reason, according to this embodiment, the count value can be prevented from being saturated during the exposure period, and an image with favorable gradation can be obtained.

As mentioned above, upon the latch signal PLAT switching to the H level at timing t603, the count value of the counter 306 is held in the pixel memory 307. Then, the reset signal PRES changes from the L level to the H level at timing t604, and the counter 306 is reset. Upon the reset PRES being restored to the L level from the H level, the reset of the counter 306 is released. Thus, the number of pulses of the pulse signal PLS cannot be counted by the counter 306 during the period from timing t603 at which the latch signal PLAT switches to the H level to the timing at which the reset of the counter 306 is released. This indicates that the exposure period is shortened by this period. Accordingly, the exposure period may be extended by this period.

Also, a configuration may be employed in which the solid-state image sensor 100 can be driven in a driving mode (second driving mode) that differs from the driving mode (first driving mode) illustrated in FIG. 6. In the second driving mode, for example, the operation of the saturation detector 205 is disabled. In the second driving mode, the count value obtained by the counter value 306 during the exposure period is not output to the frame memory 206 during the exposure period. In the second driving mode, the count value of the counter 306 is output to the frame memory 206 after the exposure period has ended. For example, a configuration may be employed in which the solid-state image sensor 100 is driven in the first driving mode under a high illuminance environment, and the solid-state image sensor 100 is driven in the second driving mode under a low illuminance environment.

Second Embodiment

A solid-state image sensor, an image capturing apparatus, and an image capturing method according to the second embodiment will be described with reference to FIGS. 7 to 9. Note that the same constituent elements as those of the solid-state image sensor and so on according to the first embodiment illustrated in FIGS. 1 to 6 are assigned the same signs, and a description thereof is omitted or simplified.

In the solid-state image sensor according to this embodiment, the pixel memory 307 (see FIG. 3) is not included in a counter portion 801 in each unit pixel 701.

Figure 7:
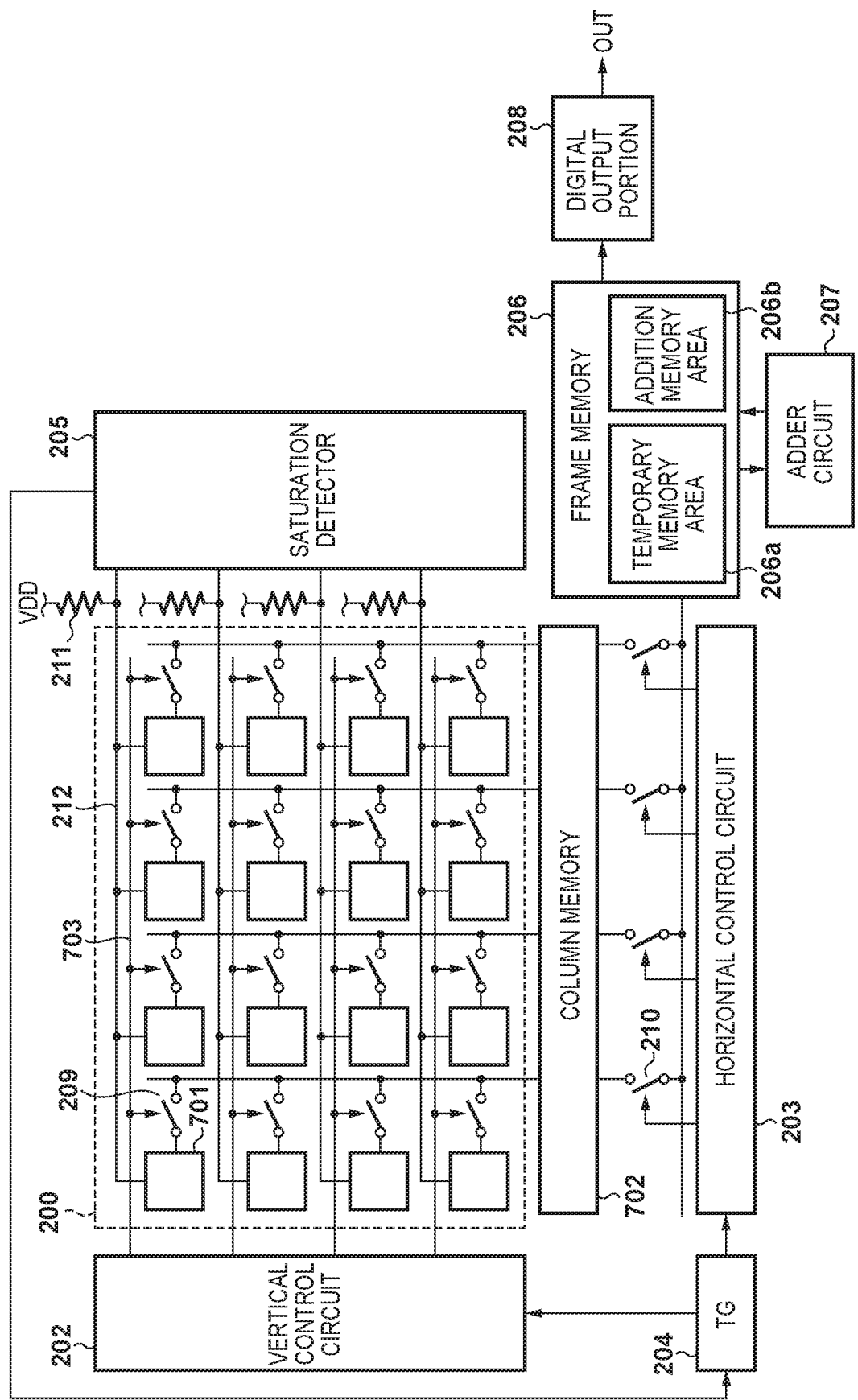
FIG. 7 illustrates a solid-state image sensor according to a second embodiment.

FIG. 7 illustrates the solid-state image sensor 100 according to the second embodiment. The pixel array 200 includes a plurality of unit pixels 701. The vertical control circuit 202 selects, row-by-row, a plurality of unit pixels 701 provided in the pixel array 200 using switches 209. The switches 209 are controlled row-by-row using a row selection signal PSEL, which is supplied from the vertical control circuit 202 via an interconnect 703.

A column memory 702 is provided between the pixel array 200 and the horizontal control circuit 203. The column memory 702 temporarily holds pixel signals from each column output from the unit pixels 701 that are selected row-by-row by the vertical control circuit 202.

Figure 8:
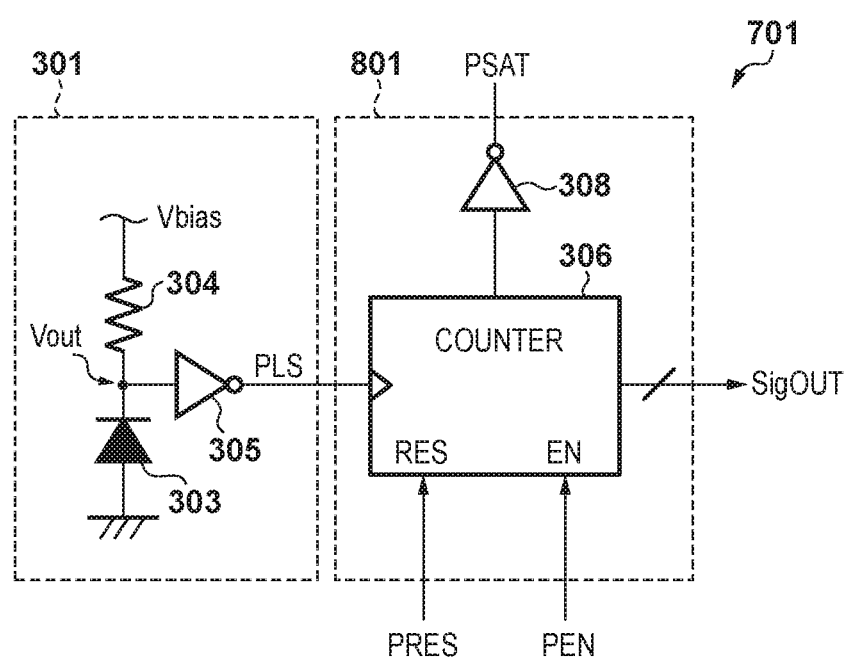
FIG. 8 illustrates a unit pixel that is provided in the solid-state image sensor according to the second embodiment.

FIG. 8 illustrates a unit pixel 701 provided in the solid-state image sensor according to this embodiment. As illustrated in FIG. 8, the unit pixel 701 includes the sensor portion 301 and a counter portion 801. The counter portion 801 includes the counter 306 and the inverting buffer 308. The counter portion 801 does not include the pixel memory 307 (see FIG. 3). Since the counter portion 801 does not include the pixel memory 307, in this embodiment, the count value of the counter 306 is held row-by-row in the column memory 702, not via the pixel memory 307.

The reset signal PRES is supplied, row-by-row, to the reset terminal RES of the counter 306 from the vertical control circuit 202. Accordingly, the count value of the counter 306 is reset row-by-row.

Figure 9:
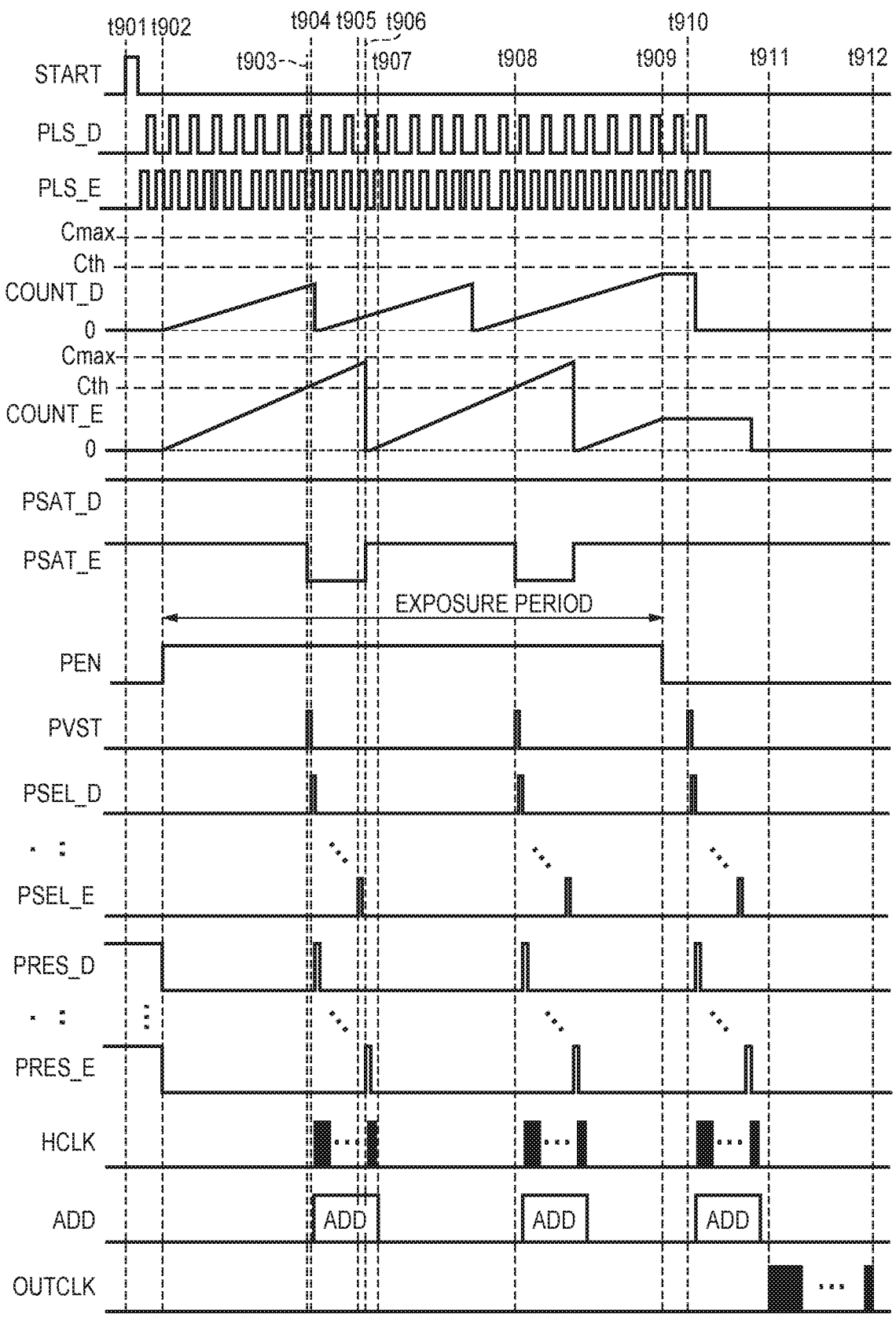
FIG. 9 is a timing chart illustrating an example of operations of the solid-state image sensor according to the second embodiment.

FIG. 9 is a timing chart illustrating operations of the solid-state image sensor according to this embodiment. Here, a description will be given of an exemplary case of acquiring an image of one of a plurality of frames that constitute a moving image, but this may not necessarily be the case.

FIG. 9 shows pulse signals PLS_D and PLS_E, which are output respectively from the sensor portions 301 in two arbitrary unit pixels 701, namely unit pixels D and E, out of the plurality of unit pixels 701 provided in the pixel array 200. The unit pixel D is arranged in the first row in the pixel array 200, and a pixel signal thereof is read out first when pixel signals are output. Meanwhile, the unit pixel E is arranged in the last row in the pixel array 200, and a pixel signal thereof is read out lastly when pixel signals are output. Here, a description is given of an exemplary case where the largest number of photons enters the unit pixel E.

The count values COUNT_D and COUNT_E shown in FIG. 9 are count values obtained by the counters 306 in the unit pixels D and E, respectively. Each counter 306 can count from a count lower limit value 0 to a count upper limit value Cmax. If the count value of a counter 306 is greater than or equal to the threshold Cth, the threshold-reach signal PSAT output from the unit pixel 701 that includes the counter 306 whose count value is greater than or equal to the threshold Cth changes from the H level to the L level. Thus, the potential of the interconnect 212 provided for the row in which this unit pixel 701 is located changes from the H level to the Low level. The threshold-reach signal PSAT that has changed from the H level to the L level is detected by the saturation detector 205. Threshold-reach signals PSAT_D and PSAT_E are threshold-reach signals PSAT respectively from the rows in which the unit pixels D and E are arranged. A row selection signal PSEL_D is supplied to the row in which the unit pixel D is arranged, i.e. the first row in the pixel array 200. A row selection signal PSEL_E is supplied to the row in which the unit pixel E is arranged, i.e. the last row in the pixel array 200. Upon a row selection signal PSEL switching to the H level, the switches 209 in the corresponding row turn on. Upon the switches 209 turning on, the count values of the counters 306 in the unit pixels 701 that correspond to these switches 209 are output to the column memory 702, and these count values are held in the column memory 702. A reset signal PRES_D is supplied to the row in which the unit pixel D is arranged, i.e. the first row in the pixel array 200. A reset signal PRES_E is supplied to the row in which the unit pixel E is arranged, i.e. the last row in the pixel array 200. Upon the reset signal PRES switching to the H level, the count values of the counters 306 in the corresponding row are reset to 0.

An output start signal PVST is a signal for starting output of the count value acquired in each unit pixel 701 to the column memory 702, and is supplied from the timing generator 204 to the vertical control circuit 202. Upon the output start signal PVST changing from the L level to the H level, an operation to output the count value obtained by the counter 306 to the column memory 702 and an operation to reset the counter 306 are performed row-by-row in the order from the first row in the pixel array 200.

At timing t901, upon a shooting start instruction being given by a user or the like through the operating portion 108, the controller 104 supplies a shooting start signal START, which is a pulse-shaped signal, to the solid-state image sensor 100. Upon the shooting start signal START switching to the H level, the timing generator 204 supplies the bias voltage Vbias to each sensor portion 301. Upon the bias voltage Vbias being supplied to the sensor portions 301, a bias voltage that is greater than or equal to the breakdown voltage of the photodiode 303 is applied to the photodiode 303, and the photodiode 303 then operates in the Geiger mode. Thus, the sensor portion 301 outputs a pulse signal PLS corresponding to photons that enter the photodiode 303.

At timing t901, the reset signal PRES is at the H level. Also, at timing t901, the counter 306 in each unit pixel 701 has been reset to 0.

At timing t902, the timing generator 204 simultaneously supplies an L-level reset signal PRES to all rows in the pixel array 200. Thus, the reset of the counters 306 in all unit pixels 701 provided in the pixel array 200 is released. The timing generator 204 also supplies an H-level enable signal PEN to all rows in the pixel array 200. Thus, the counters 306 in all unit pixels 701 provided in the pixel array 200 enter an enabled state, and the count value of the counter 306 in each unit pixel 701 increases in accordance with the input pulse signal PLS. Thereafter, the counting for this frame is continued until timing t909 at which the enable signal PEN changes to the L level. Accordingly, the period from timing t902 to timing t909 corresponds to an exposure period. Since the frequency at which photons enter the unit pixel E is highest, the increase rate of the count value COUNT_E is highest.

At timing t903, upon the count value COUNT_E reaching the threshold Cth, the threshold-reach signal PSAT_E from the row in which the unit pixel E is arranged switches to the L level. Upon detecting that the threshold-reach signal PSAT in any of the rows has changed to the L level, the saturation detector 205 outputs the output start signal PVST, which is a pulse-shaped signal, and thus, an operation to read out pixel signals is started.

At timing t904, upon the row selection signal PSEL_D, which is a pulse-shaped signal, being supplied to the first row in the pixel array 200, the count value of each of the unit pixels 701 arranged in the first row, in which the unit pixel D is arranged, is output to the column memory 702. Upon the pulse-shaped reset signal PRES_D being supplied to the first row in the pixel array 200, the count value of each of the unit pixels 701 arranged in the first row, in which the unit pixel D is arranged, is reset to 0. In parallel with this operation, the signal HCLK is supplied from the timing generator 204 to the horizontal control circuit 203, and the switches 210 in each row sequentially turn on. Thus, the count values held in the column memory 702, i.e. the pixel signals acquired by the unit pixels 701 located in the first column are sequentially output to the frame memory 206, and these pixel signals are held by the temporary memory area 206a in the frame memory 206.

After all pixel signals acquired by the unit pixels 701 located in the first row have been transferred from the column memory 702 to the frame memory 206, the pulse-shaped row selection signal PSEL is supplied to the second row of the pixel array 200, and thereafter, the above-described operation is sequentially performed. That is to say, an operation to output the count values obtained by the counters 306 to the column memory 702 and an operation to reset the counters 306 are sequentially performed. The above-described operations are repeated to the last row in the pixel array 200. The following processing is performed by the adder circuit 207 in parallel with storing the pixel signals in the frame memory 206. That is to say, the adder circuit 207 performs processing to add a pixel signal held in the temporary memory area 206a in the frame memory 206 and a pixel signal of the same address held in the addition memory area 206b in the frame memory 206. The pixel signal obtained by the addition performed by the adder circuit 207 is held by the addition memory area 206b in the frame memory 206.

At timing t905, upon the pulse-shaped row selection signal PSEL_E being supplied to the last row in the pixel array 200, the count value of each of the unit pixels 701 arranged in the last row, in which the unit pixel E is arranged, is output to the column memory 702. Then, at timing t906, upon the pulse-shaped reset signal PRES_E being supplied to the last row in the pixel array 200, the count value of each of the unit pixels 701 arranged in the last row, in which the unit pixel E is arranged, is reset to 0. At timing t906, the threshold-reach signal PSAT_E from the last row, in which the unit pixel E is arranged, is restored to the H level from the L level.

At timing t907, the pixel signals output from the unit pixels 701 located in the last row in the pixel array 200 are stored in the frame memory 206. Upon completion of the addition processing for the pixel signals output from the unit pixels 701 located in the last row in the pixel array 200 performed by the adder circuit 207, the storing of the pixel signals output from all unit pixels 701 in the pixel array 200 in the frame memory 206 is completed.

In the period from timing t903 to t907, the storing of the pixel signals output from the unit pixels 701 in the frame memory 206 is not completed, and therefore, the timing generator 204 does not supply a new output start signal PVST to the vertical control circuit 202.

During the addition processing performed in the period from timing t904 to timing t907, i.e. the first addition processing, no pixel signal is held in the addition memory area 206b in the frame memory 206. For this reason, the pixel signals that have been output from each unit pixel 701 and stored in the temporary memory area 206a are held, as-is, in the addition memory area 206b.

At timing t908, upon the count value COUNT_E again reaching the threshold Cth, the threshold-reach signal PSAT_E from the row in which the unit pixel E is arranged switches to the L level. Then, the pixel signal from each unit pixel 701 is stored in the temporary memory area 206a in the frame memory 206, similarly to processing in the period from timing t903 to timing t907. Then, the pixel signal stored in the temporary memory area 206a and the pixel signal held in the addition memory area 206b are added by the adder circuit 207, and the pixel signal obtained by the addition is stored in the addition memory area 206b. Thereafter, the above-described processing is repeated every time the count value of any of the unit pixels 701 reaches the threshold Cth.

Note that the count value COUNT_E of the unit pixel E that is arranged in the last row in the pixel array 200 continues to increase even after reaching the threshold Cth at timing t903, in accordance with the number of incident photons, until timing t906. That is to say, the count value of the counter 306 increases until the storing of the pixel signals output from the unit pixels 701 arranged in the last row in the pixel array 200 in the frame memory 206 is completed and the counter 306 is reset. The threshold Cth is set so as to satisfy Expression (1) below so that the count values of the unit pixels 701 in the last row do not reach the count upper limit value Cmax before the storing of the pixel signals of all unit pixels 701 provided in the pixel array 200 in the frame memory 206 is completed.

$$Cth < C \max - Trd/\Delta Tp \qquad (1)$$

Here, Tdr corresponds to the period from timing t903 to timing t906. That is to say, Tdr indicates the period from a timing at which the output start signal PVST is supplied, until the reset signal PRES_E is supplied to the unit pixels 701 located in the last row in the pixel array 200. $\Delta Tp$ denotes the smallest pulse width of the pulse signal PLS output from the sensor portions 301.

Although the threshold Cth is uniformly set in Expression (1) above, this may not necessarily be the case. For example, the threshold Cth may be differentiated row-by-row, as with Expression (2) below.

$$Cth(n) < C \max - T1h \times n/\Delta Tp \qquad (2)$$

Here, n denotes an nth row. Cth(n) denotes the threshold Cth for the nth row. T1h denotes the time required to transfer pixel signals for one row to the frame memory 206. That is to say, T1h corresponds to the time taken after the row selection signal PSEL for one row has switched to the H level until the row selection signal PSEL for the next row switches to the H level.

At timing t909, after the exposure period has ended, the enable signal PEN switches to the L level. Thus, the count value of each unit pixel 701 no longer increases even if a photon enters this unit pixel 701. Also, at timing t909, the bias voltage Vbias is no longer supplied to the sensor portions 301, and the sensor portions 301 no longer output the pulse signal PLS.

Thereafter, the timing generator 204 performs the following processing to store the count values of the counters 306 at the end of the exposure period in the frame memory 206. That is to say, the timing generator 204 outputs the pulse-shaped output start signal PVST at timing t910. Thus, the pixel signal of each unit pixel 701 is held by the temporary memory area 206a in the frame memory 206, similarly to timings t903 to t907. The pixel signal obtained through the addition processing performed by the adder circuit 207 is held by the addition memory area 206b in the frame memory 206.

The pixel signal held by the addition memory area 206b is a signal obtained as a result of the adder circuit 207 adding the pixel signals acquired from the counter 306 during the exposure period from timing t902 to timing t909. The pixel signal that is thus obtained is a signal that corresponds to the number of photons that have entered during the exposure period. As described above, according to this embodiment as well, the count value of each counter 306 can be prevented from being saturated during the exposure period.

In the period from timing t911 to timing t912, the control signal OUTCLK is supplied from the timing generator 204 to the digital output portion 208. As a result, pixel signals held in the addition memory area 206b in the frame memory 206, i.e. the pixel signals obtained through addition during the exposure period are sequentially output to the outside of the solid-state image sensor 100 via the digital output portion 208. After the output of the pixel signals to the outside of the solid-state image sensor 100 has been completed, the pixel signals held in the addition memory area 206b in the frame memory 206 are reset to 0.

As described above, in this embodiment as well, count values are acquired and the reset operation is performed every time the count value of the counter 306 in any of the unit pixels 201 reaches the threshold Cth. For this reason, according to this embodiment as well, the count value can be prevented from being saturated during the exposure period, and an image with favorable gradation can be obtained.

Third Embodiment

A solid-state image sensor, an image capturing apparatus, and an image capturing method according to the third embodiment will be described with reference to FIGS. 10 to 11. Note that the same constituent elements as those of the solid-state image sensor and so on according to the first or second embodiment illustrated in FIGS. 1 to 9 are assigned the same signs, and a description thereof is omitted or simplified.

In the solid-state image sensor according to this embodiment, a saturation detector 1104, an adder circuit 1105, and an addition memory 1106 are included in each unit pixel 1101.

Figure 10:
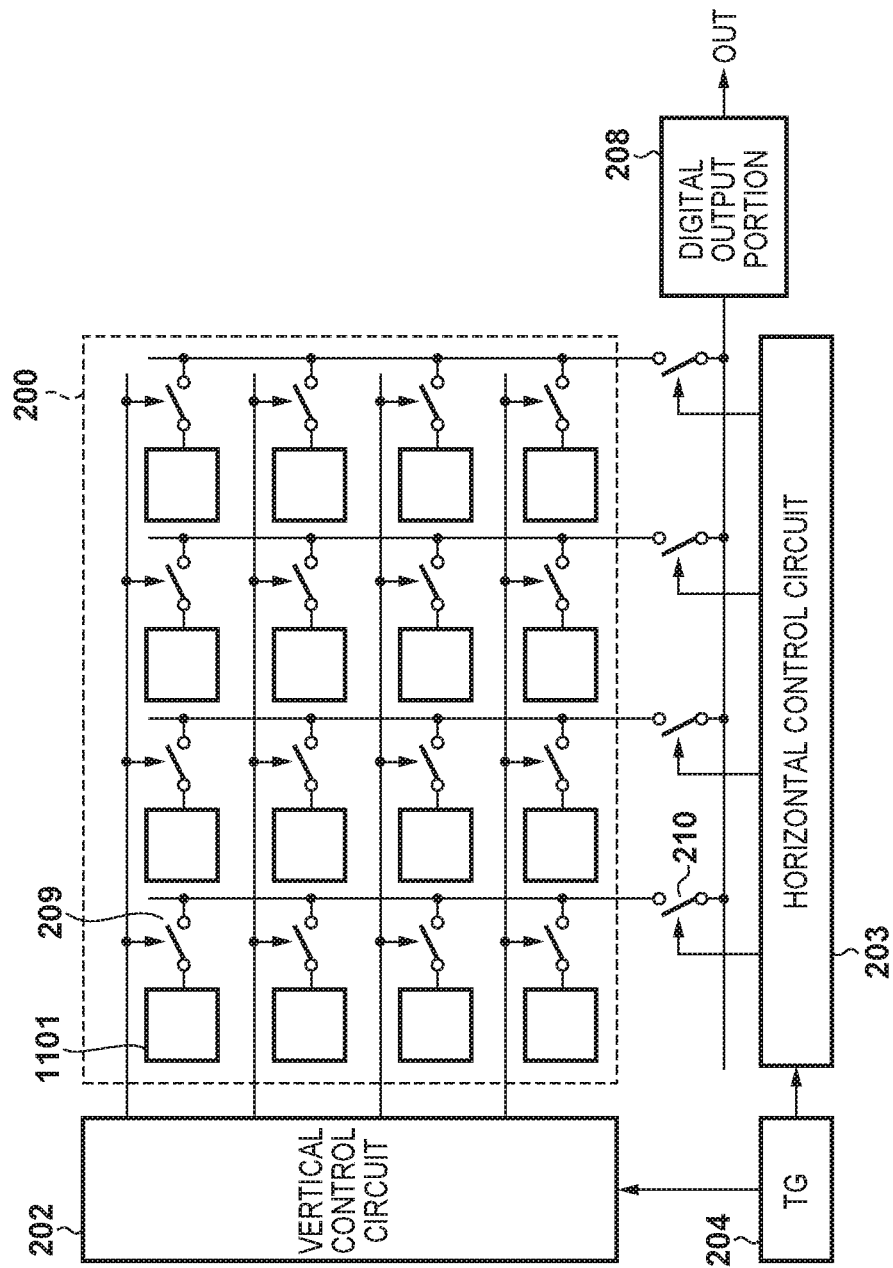
FIG. 10 illustrates a solid-state image sensor according to a third embodiment.

FIG. 10 illustrates the solid-state image sensor 100 according to this embodiment. A plurality of unit pixels 1101 are arranged in a matrix in the pixel array 200.

Figure 11:
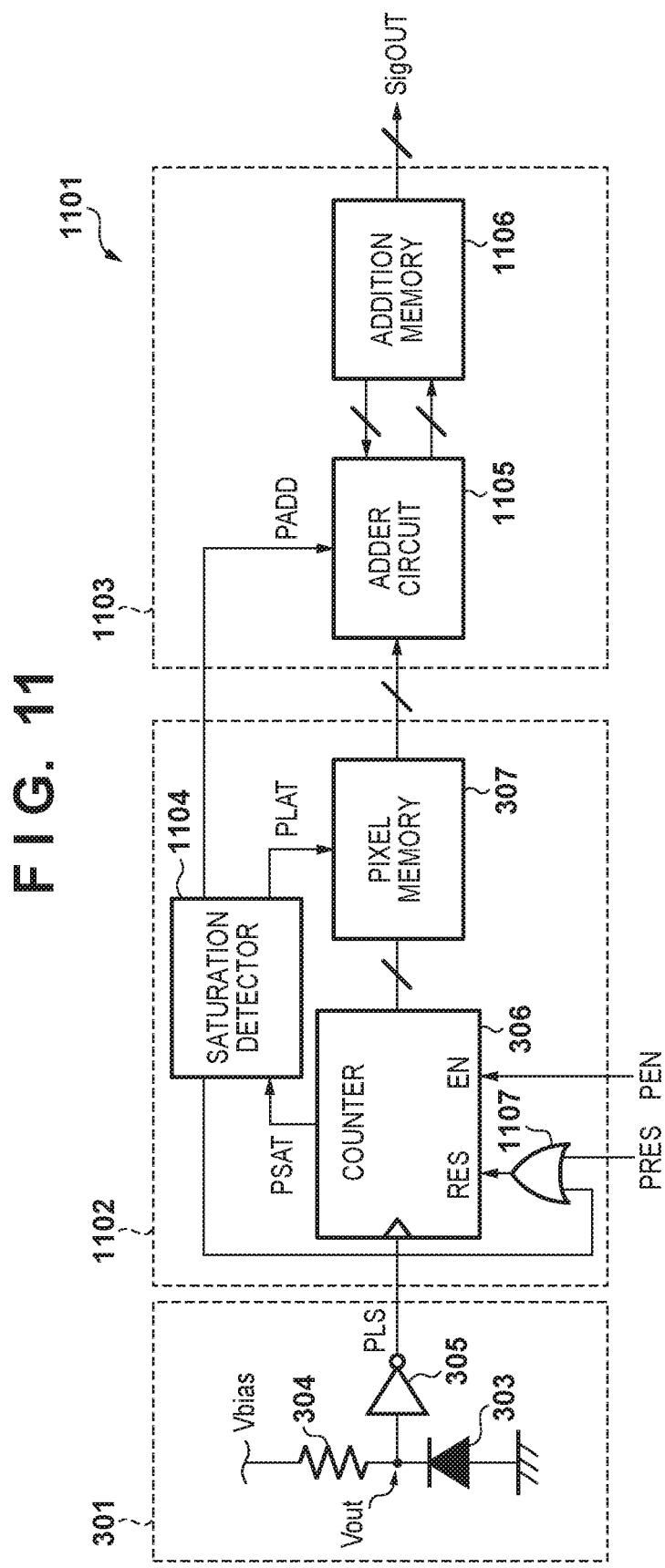
FIG. 11 illustrates a unit pixel that is provided in the solid-state image sensor according to the third embodiment.

FIG. 11 illustrates a unit pixel 1101 provided in the solid-state image sensor according to this embodiment.

The unit pixel 1101 includes the sensor portion 301, a counter portion 1102, and an addition portion 1103.

The counter portion 1102 includes the counter 306, the pixel memory 307, and a saturation detector 1104. Upon the count value of the counter 306 reaching the predetermined threshold Cth during an exposure period, the threshold-reach signal PSAT changes from the L level to the H level. The threshold-reach signal PSAT output from the counter 306 is supplied to the saturation detector 1104. Upon the threshold-reach signal PSAT changing from the L level to the H level, the saturation detector 1104 supplies the latch signal PLAT to the pixel memory 307. Upon the latch signal PLAT being supplied from the saturation detector 1104 to the pixel memory 307, the count value acquired by the counter 306 is held in the pixel memory 307. Thereafter, the saturation detector 1104 supplies a reset signal to one input terminal of an OR gate 1107. Thus, the reset signal output from the saturation detector 1104 is supplied to the reset terminal RES of the counter 306 via the OR gate 1107. Upon the reset signal being supplied from the saturation detector 1104 to the counter 306 via the OR gate 1107, the counter 306 resets the count value. The reset signal PRES supplied from the vertical control circuit 202 is supplied to the other input terminal of the OR gate 1107. The reset signal PRES output from the vertical control circuit 202 is also input to the reset terminal RES of the counter 306 via the OR gate 1107. Thus, the counter 306 is reset by the reset signal supplied from the saturation detector 1104, and is also reset by the reset signal PRES supplied from the vertical control circuit 202.

The addition portion 1103 includes the adder circuit 1105 and the addition memory 1106. The adder circuit 1105 corresponds to the adder circuit 207 that has been described above with reference to FIG. 2. The addition memory 1106 corresponds to the addition memory area 206b in the frame memory 206 that has been described above with reference to FIG. 2. The addition memory 1106 holds an added pixel signals held in the pixel memory 307 during an exposure period, added by the adder circuit 1105. The bit width of the addition memory 1106 is sufficiently greater than the bit width of the counter 306, and is also sufficiently greater than the bit width of the pixel memory 307.

After supplying the latch signal PLAT to the pixel memory 307, the saturation detector 1104 supplies an addition control signal PADD to the adder circuit 1105. Upon the addition control signal PADD being supplied from the saturation detector 1104 to the adder circuit 1105, the adder circuit 1105 adds the pixel signal held in the pixel memory 307 and the pixel signal held in the addition memory 1106. The adder circuit 1105 then causes the addition memory 1106 to hold the pixel signal obtained by the addition.

After the exposure period has ended, the pixel signal held in the addition memory 1106 in each unit pixel 1101 is sequentially output to the digital output portion 208 in accordance with control performed by the vertical control circuit 202 and the horizontal control circuit 203. This operation is the same as the operation according to the first embodiment, and a detailed description thereof is omitted accordingly.

As described above, each unit pixel 1101 may include the saturation detector 1104, the adder circuit 1105, and the addition memory 1106. In this embodiment as well, the count values can be prevented from being saturated during an exposure period, and an image with favorable gradation can be obtained.

Fourth Embodiment

A solid-state image sensor, an image capturing apparatus, and an image capturing method according to the fourth embodiment will be described with reference to FIGS. 12A and 12B. Note that the same constituent elements as those of the solid-state image sensor and so on according to the first to third embodiments illustrated in FIGS. 1 to 11 are assigned the same signs, and a description thereof is omitted or simplified.

The solid-state image sensor according to this embodiment can prevent an unfavorable threshold-reach signal PSAT being output from a defective pixel, which is a defective unit pixel.

If a crystal defect exists in the photodiode 303, a dark current occurs due to the crystal defect, and there may be a case where the avalanche multiplication phenomenon occurs in the photodiode 303 even though no photon has entered the photodiode 303. The sensor portion 301 that includes a photodiode 303 in which a crystal defect exists may output the pulse signal PLS very frequently even though no photon has entered the photodiode 303. A unit pixel that includes such a defective photodiode 303 is called a defective pixel.

Figure 12A:
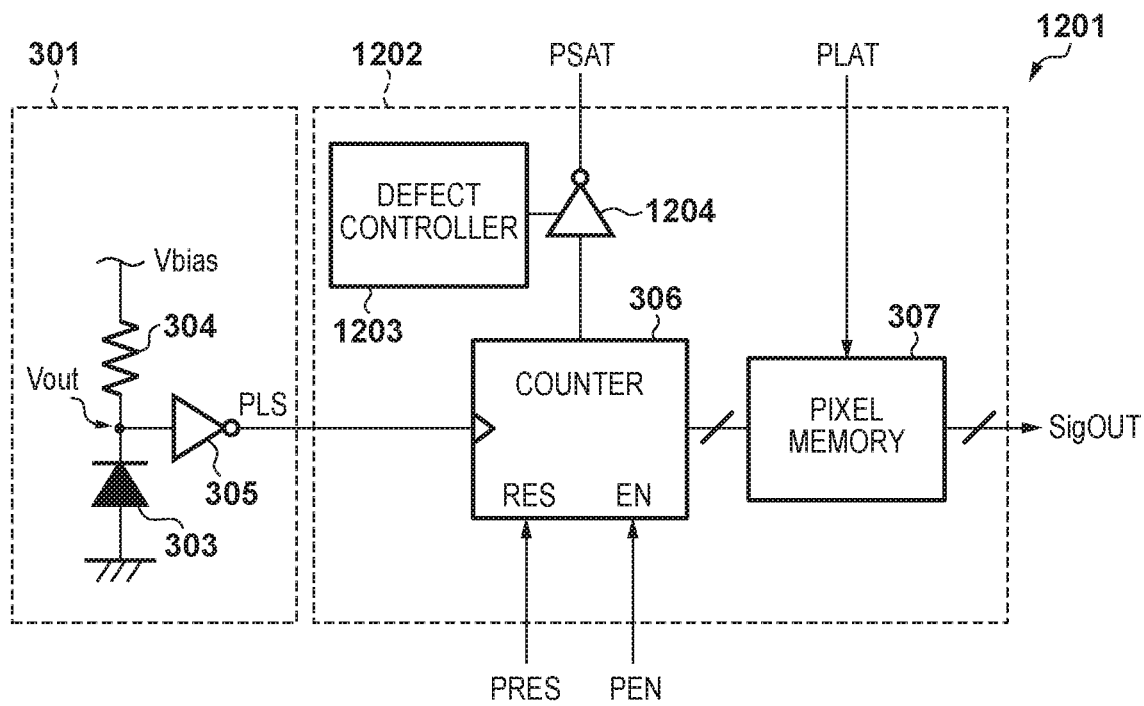
FIGS. 12A and 12B illustrate unit pixels that are provided in a solid-state image sensor according to a fourth embodiment.
Figure 12B:
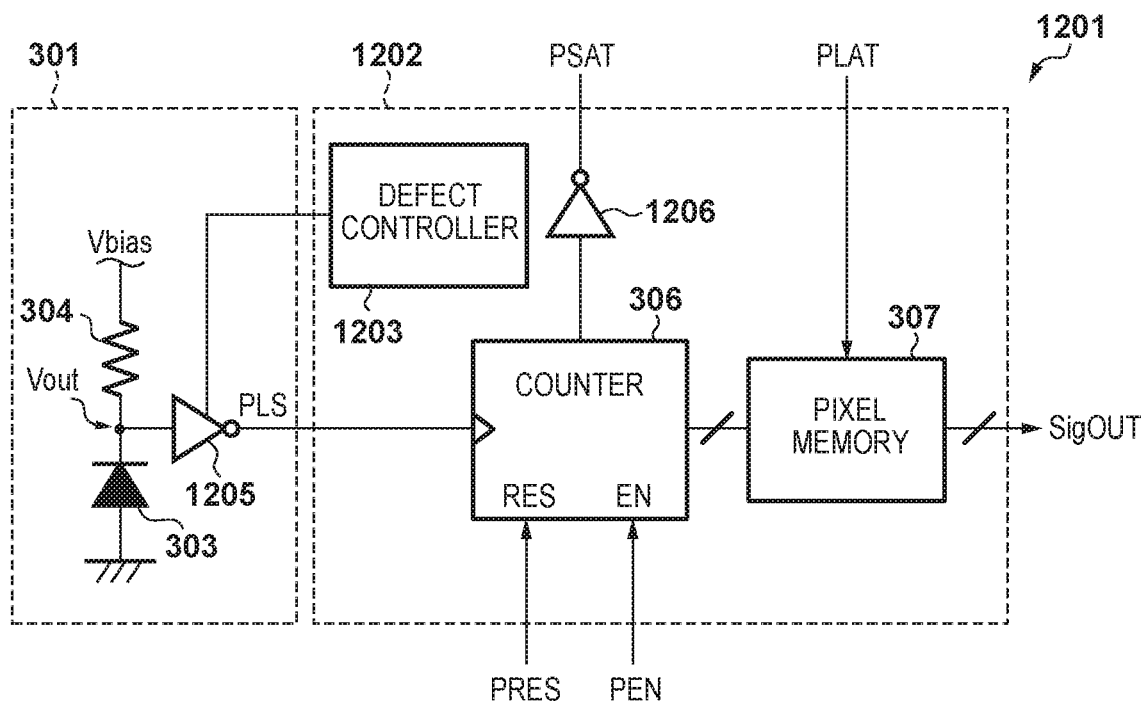

FIG. 12A illustrates a unit pixel 1201 provided in the solid-state image sensor according to this embodiment. A plurality of unit pixels 1201 are arranged in a matrix in the pixel array 200. The configuration of the solid-state image sensor according to this embodiment is the same as that of the solid-state image sensor according to the first embodiment, except for the configuration of the unit pixel 1201.

The unit pixel 1201 includes the sensor portion 301 and a counter portion 1202. The counter portion 1202 includes the counter 306, the pixel memory 307, a defect controller 1203, and an inverting buffer 1204 with an enable terminal. A threshold-reach signal PSAT output from the counter 306 is output via the inverting buffer 1204. If the enable signal supplied from the defect controller 1203 to the inverting buffer 1204 is at the L level, the inverting buffer 1204 is in an off state. If the inverting buffer 1204 is in the off state, the output of this inverting buffer 1204 is always in a high-impedance state, and the threshold-reach signal PSAT is not output from the inverting buffer 1204. On the other hand, if the enable signal supplied from the defect controller 1203 to the inverting buffer 1204 is at the H level, the inverting buffer 1204 is in an on state. If the inverting buffer 1204 is in an on state, the inverting buffer 1204 can operate similarly to the inverting buffer 308 that has been described above with reference to FIG. 3.

The defect controller 1203 supplies an enable signal to the inverting buffer 1204 based on defect information, which indicates whether or not each of the unit pixels 1201 is a defective pixel. If an arbitrary unit pixel 1201 is a defective pixel, in this unit pixel 1201, the enable signal supplied from the defect controller 1203 to the inverting buffer 1204 is at the L level, and the inverting buffer 1204 is in an off state. On the other hand, if this unit pixel 1201 is not a defective pixel, in this unit pixel 1201, the enable signal supplied from the defect controller 1203 to the inverting buffer 1204 is at the H level, and the inverting buffer 1204 is in an on state. The defect information that indicates whether or not each of the unit pixels 1201 is a defective pixel is supplied, in advance, to the defect controller 1203 in each unit pixel 1201 using the vertical control circuit 202 and the horizontal control circuit 203, and is held by the defect controller 1203 in each unit pixel 1201. The defect controller 1203 and the inverting buffer 1204 prevent a signal indicating that the count value of the counter 306 provided in this unit pixel 1201 has reached the threshold from being output.

The pixel signal output from the unit pixel 1201 that is a defective pixel is subjected to correction processing by the signal processor 101 or the controller 104.

Although a description has been given here of an exemplary case where the inverting buffer 1204 with the enable terminal is provided in the counter portion 1202, this may not necessarily be the case. FIG. 12B illustrates another example of a unit pixel 1201 provided in the solid-state image sensor according to this embodiment. As illustrated in FIG. 12B, the sensor portion 301 includes the photodiode 303, the quenching resistor 304, and an inverting buffer 1205 with an enable terminal. The counter portion 1202 includes the counter 306, the pixel memory 307, the defect controller 1203, and an inverting buffer 1206. The enable signal output from the defect controller 1203 provided in the counter portion 1202 is input to the enable terminal of the inverting buffer 1205 with the enable terminal provided in the sensor portion 301. Thus, the inverting buffer 1205 with the enable terminal may be provided in the sensor portion 301. The defect controller 1203 and the inverting buffer 1205 prevent a pulse from being output from the sensor portion 301 provided in this unit pixel 1201.

According to this embodiment, the threshold-reach signal PSAT can be prevented from being output from a defective pixel. As a result, according to this embodiment, transfer of a pixel signal to the frame memory 206 can be prevented from occurring frequently due to a defective pixel.

Fifth Embodiment

A solid-state image sensor, an image capturing apparatus, and an image capturing method according to the fifth embodiment will be described with reference to FIGS. 13 to 18. Note that the same constituent elements as those of the solid-state image sensor and so on according to the first to fourth embodiments illustrated in FIGS. 1 to 12A are assigned the same signs, and a description thereof is omitted or simplified.

Figure 14:
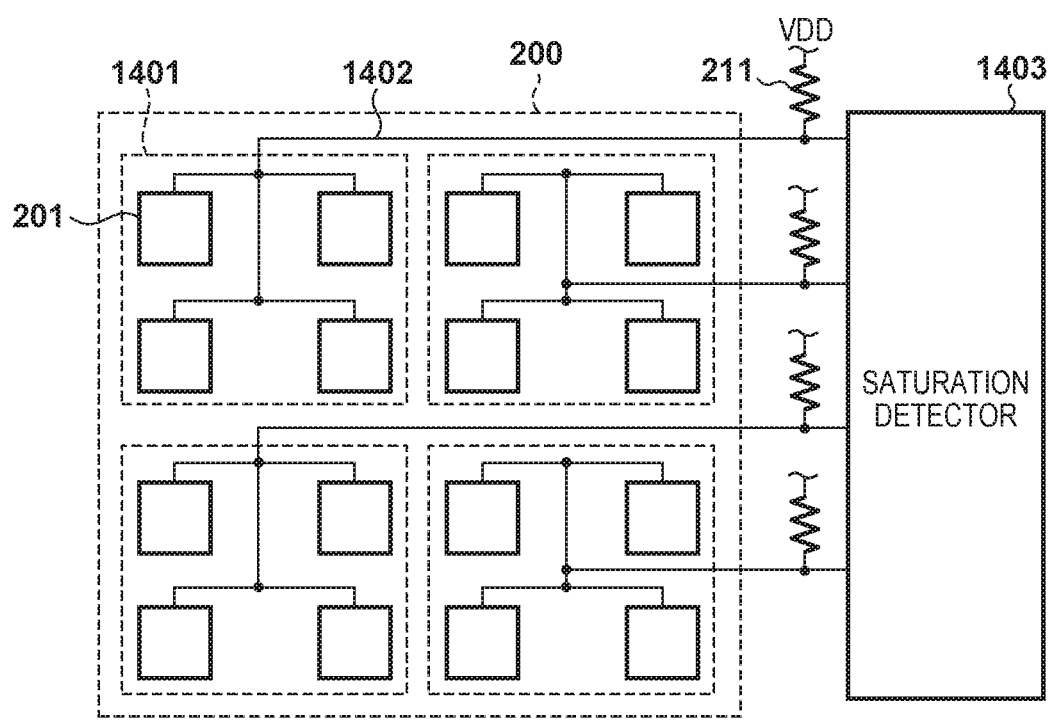
FIG. 14 illustrates a solid-state image sensor according to the fifth embodiment.

The image capturing apparatus according to this embodiment includes a photometer 1303, and can perform control so as to selectively disable the threshold-reach signal PSAT in each block 1401 in the pixel array 200 illustrated in FIG. 14, based on photometric results from the photometer 1303. The image capturing apparatus according to this embodiment can also perform control so as to selectively disable the threshold-reach signal PSAT in accordance with a user operation made through the operating portion 108.

Figure 13:
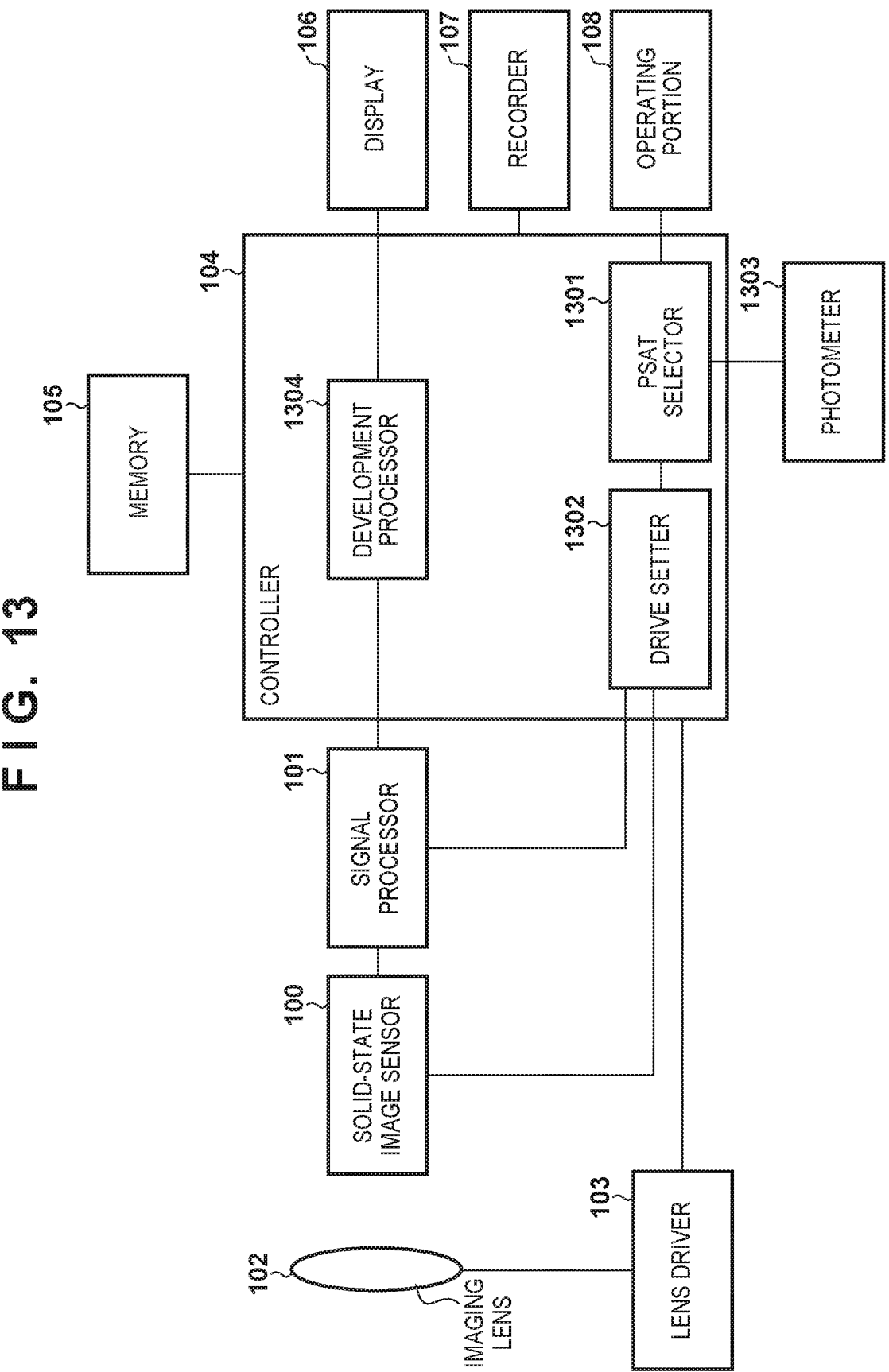
FIG. 13 is a block diagram illustrating an image capturing apparatus according to a fifth embodiment.

FIG. 14 illustrates a solid-state image sensor 100 according to this embodiment. In FIG. 14, the pixel array 200 and a saturation detector 1403 are extracted and shown. The constituent elements other than the pixel array 200 and the saturation detector 1403 are the same as those of the solid-state image sensor 100 according to the first embodiment. Although FIG. 13 illustrates 4 rows×4 columns of unit pixels 201, namely 16 unit pixels 201, to simplify the description, a large number of unit pixels 201 are provided in the pixel array 200 in practice.

As illustrated in FIG. 14, for example, one block 1401 is constituted by two rows×two columns of unit pixels 201, namely four unit pixels 201. An interconnect 1402 for transmitting the threshold-reach signal is shared by the blocks 1401. The threshold-reach signal PSAT that is output from any of the plurality of unit pixels 201 provided in each block 1401 is supplied to the saturation detector 1403 via the interconnect 1402.

Returning to FIG. 13, the photometer 1303 includes a photometric image sensor (not shown), such as a CCD or CMOS image sensor, and receives, via a movable mirror or the like (not shown), light that has entered through the imaging lens 102. The photometer 1303 includes a plurality of photometric areas 1501, such as those illustrated in FIG. 15, measures subject luminance in every photometric area 1501, and sends the photometric results to the controller 104.

The controller 104 includes a PSAT selector 1301, a drive setter 1302, and a development processor 1304.

The PSAT selector 1301 receives the photometric results from the photometer 1303, and determines a block regarding which the threshold-reach signal PSAT is disabled, out of the blocks 1401 in the pixel array 200. The threshold-reach signal PSAT is enabled in blocks whose threshold-reach signal PSAT is not disabled. The PSAT selector 1301 can also selectively determine a block whose threshold-reach signal PSAT is disabled, in accordance with a user operation made through the operating portion 108. Information (hereinafter, "PSAT selection information") regarding whether to enable the threshold-reach signal PSAT from each of the blocks in the pixel array 200 is transmitted to the drive setter 1302.

The drive setter 1302 transmits a control signal for controlling the solid-state image sensor 100 and the signal processor 101. Based on the PSAT selection information transmitted from the PSAT selector 1301, the drive setter 1302 also transmits a control signal for enabling or disabling the threshold-reach signal PSAT from each block 1401 in the pixel array 200, to the solid-state image sensor 100.

The saturation detector 1403 sets whether to enable or disable the threshold-reach signal PSAT supplied from each block 1401, based on the control signal from the drive setter

1302. If the saturation detector 1403 is set so as to disable the threshold-reach signal PSAT output from one block 1401, the saturation detector 1403 operates as follows. That is to say, if the threshold-reach signal PSAT is supplied from this block 1401 to the saturation detector 1403, the saturation detector 1403 regards this threshold-reach signal PSAT as being disabled. Accordingly, even if the count value of the counter 306 has reached the threshold Cth in any of the plurality of unit pixels 201 located in this block 1401, the latch signal PLAT is not supplied to the unit pixels 201 in the pixel array 200. Thus, the saturation detector 1403 ignores the count value of the counter 306 having reached the threshold, with respect to a predetermined unit pixel 201 in the plurality of unit pixels 201. On the other hand, if the saturation detector 1403 is set so as to enable the threshold-reach signal PSAT output from a given block 1401, the saturation detector 1403 operates as follows. That is to say, if the threshold-reach signal PSAT is supplied from this block 1401 to the saturation detector 1403, the saturation detector 1403 regards this threshold-reach signal PSAT as being enabled. Accordingly, if the count value of the counter 306 has reached the threshold Cth in any of the plurality of unit pixels 201 located in this block 1401, the latch signal PLAT is supplied to the unit pixels 201 in the pixel array 200.

Although a description has been given here of an exemplary case where one threshold-reach signal PSAT is output from each of the blocks 1401 in each of which two rows× two columns of unit pixels 201, namely four unit pixels 201, are arranged, this may not necessarily be the case. For example, the number of unit pixels 201 provided in each block 1401 may not be four. Also, for example, one threshold-reach signal PSAT may be output from each column.

The development processor 1304 receives image data that has been output from the solid-state image sensor 100 and subjected to various kinds of correction processing by the signal processor 101. The development processor 1304 performs development processing, such as demosaicing, on this image data. After being subjected to development processing, the image data is displayed on the display 106, for example.

Figure 16:
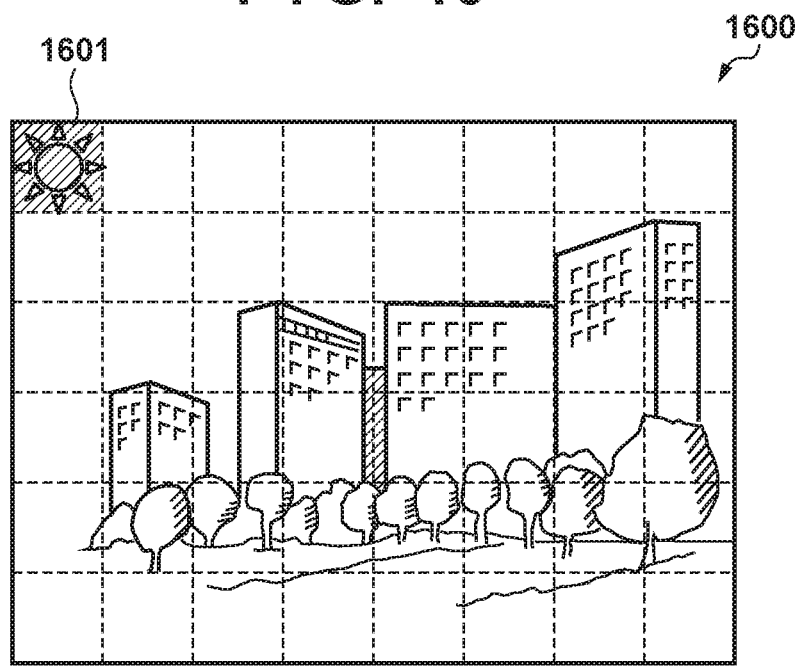
FIG. 16 illustrates an example of an image acquired by the solid-state image sensor according to the fifth embodiment.

FIG. 16 illustrates an example of an image 1600 that is acquired by the image capturing apparatus according to this embodiment. Here, a description will be given of an exemplary case where the threshold-reach signal PSAT supplied from a block 1601 is disabled, and the threshold-reach signals PSAT supplied from the blocks other than the block 1601 are enabled. The block 1601 corresponds to the sun. Since the threshold-reach signal PSAT supplied from the block 1601 is disabled, an image signal with favorable gradation cannot be obtained from the block 1601. Since the threshold-reach signals PSAT supplied from the blocks other than the block 1601 are enabled, image signals with favorable gradation can be obtained from the blocks other than the block 1601. Even if the pixel signal that corresponds to the sun is saturated, there is no particular issue.

Figure 17:
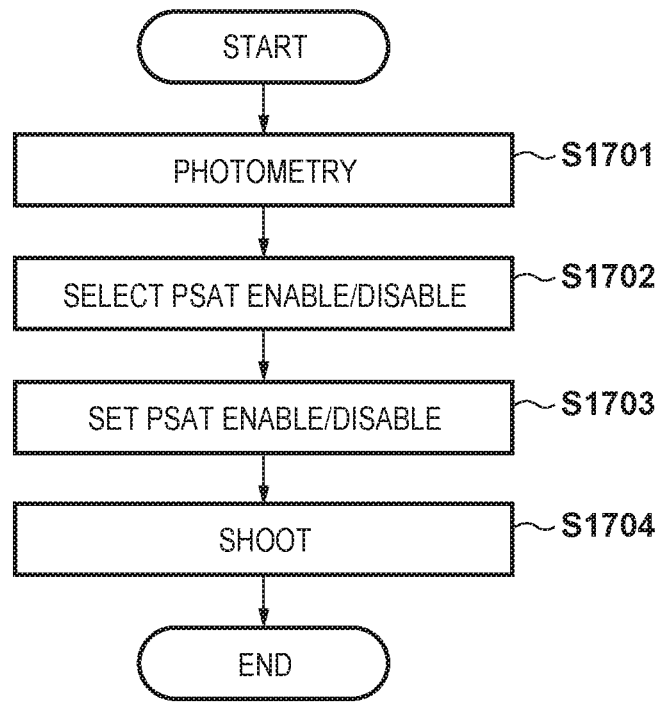
FIG. 17 is a flowchart illustrating a flow of control of the image capturing apparatus according to the fifth embodiment.

FIG. 17 is a flowchart illustrating a flow through which shooting is performed while performing control to selectively disable the threshold-reach signal PSAT based on the photometric results from the photometer 1303.

Initially, in step S1701, the photometer 1303 performs photometry, and measures subject luminance for each of the plurality of photometric areas 1501. The photometric results are transmitted to the PSAT selector 1301.

Next, in step S1702, the PSAT selector 1301 determines a block regarding which the threshold-reach signal PSAT is disabled, out of the blocks 1401 in the pixel array 200, based on the photometric results from the photometer 1303. Here, the threshold-reach signal PSAT from a block 1401 that corresponds to a photometric area 1501 in which the subject luminance is greater than or equal to a threshold is disabled. Thus, for example, the threshold-reach signal PSAT from a block in which a subject with an extremely high luminance, such as the sun, is present can be disabled. Information (PSAT selection information) regarding whether to enable or disable the threshold-reach signal PSAT from each block is transmitted to the drive setter 1302.

In step S1703, the drive setter 1302 transmits a control signal for capturing an image to the solid-state image sensor 100 and the signal processor 101. Based on the PSAT selection information transmitted from the PSAT selector 1301, the drive setter 1302 also transmits a control signal for enabling or disabling the threshold-reach signal PSAT from each block 1401 in the pixel array 200, to the solid-state image sensor 100.

In step S1704, the solid-state image sensor 100 captures an image as described above. Image data output from the solid-state image sensor 100 is subjected to various kinds of correction processing by the signal processor 101, and is then transmitted to the controller 104. Thereafter, development processing is performed by the development processor 1304, and the image data is then displayed on the display 106.

As described above, according to this embodiment, the threshold-reach signal PSAT can be selectively disabled based on the photometric results from the photometer 1303. For example, the threshold-reach signal PSAT generated from unit pixels 201 that correspond to the sun or the like can be selectively disabled. For this reason, according to this embodiment, it is possible to obtain an image with favorable gradation in areas other than the area that corresponds to the sun, for example.

Also, the user may switch between enabling and disabling the threshold-reach signal PSAT through the operating portion 108.

Figure 18:
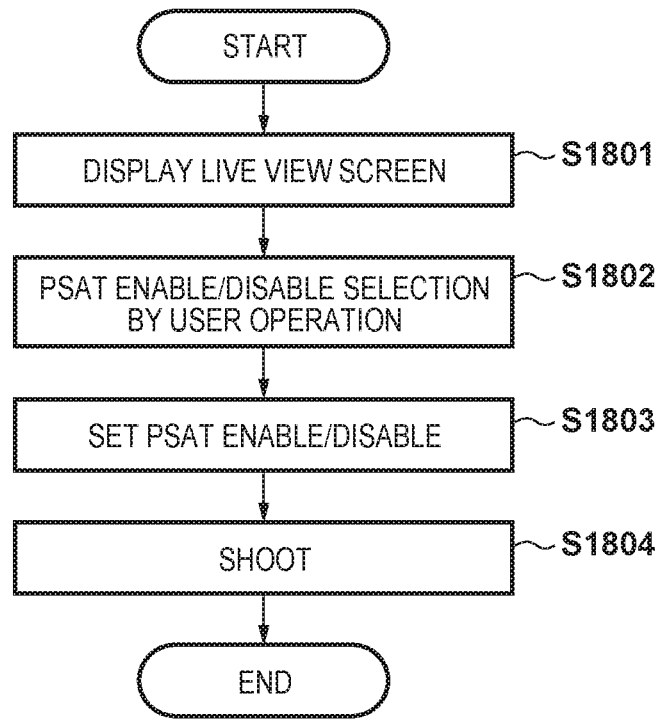
FIG. 18 is a flowchart illustrating a flow of another control of the image capturing apparatus according to the fifth embodiment.

FIG. 18 is a flowchart illustrating a flow through which shooting is performed while performing control to selectively disable the threshold-reach signal PSAT, in accordance with a user operation made through the operating portion 108.

Initially, in step S1801, the solid-state image sensor 100 captures an image, and an image that has been subjected to various kinds of correction processing by the signal processor 101 and development processing by the development processor 1304 is displayed as a live view image on the display 106.

Next, in step S1802, the user selects, through the operating portion 108, an area regarding which the threshold-reach signal PSAT is to be disabled, based on the live view image displayed on the display 106. Information regarding the selected area is input to the PSAT selector 1301. If the display 106 is a touch panel, the display 106 operates as the operating portion 108. Information (PSAT selection information) regarding whether to enable or disable the threshold-reach signal PSAT from each block selected by the user operation is transmitted from the PSAT selector 1301 to the drive setter 1302.

In step S1803, the drive setter 1302 transmits a control signal for capturing an image to the solid-state image sensor 100 and the signal processor 101. Based on the PSAT selection information transmitted from the PSAT selector 1301, the drive setter 1302 also transmits a control signal for enabling or disabling the threshold-reach signal PSAT from each block 1401 in the pixel array 200, to the solid-state image sensor 100.

In step S1804, the solid-state image sensor 100 captures an image as described above. Image data output from the solid-state image sensor 100 is subjected to various kinds of correction processing by the signal processor 101, and is then transmitted to the controller 104. Thereafter, development processing is performed by the development processor 1304, and the image data is then displayed on the display 106.

As described above, according to this embodiment, the threshold-reach signal PSAT can be selectively disabled in accordance with a user operation made through the operating portion 108. For example, the threshold-reach signal PSAT generated from a unit pixel 201 that corresponds to the sun or the like can be selectively disabled. For this reason, according to this embodiment, it is possible to obtain an image with favorable gradation in areas other than the area that corresponds to the sun, for example.

Note that, if, in step S1801, shooting is performed to display a live view image, processing to selectively disable the threshold-reach signal PSAT may not be performed. Otherwise, if PSAT selection information has been set during shooting performed prior to step S1801, shooting may be performed while selectively disabling the threshold-reach signal PSAT based on this information.

Sixth Embodiment

An image capturing apparatus and a method for controlling the same according to the sixth embodiment will be described with reference to FIGS. 19 to 22. Note that the same constituent elements as those of the solid-state image sensor and so on according to the first to fifth embodiments illustrated in FIGS. 1 to 18 are assigned the same signs, and a description thereof is omitted or simplified.

Figure 19:
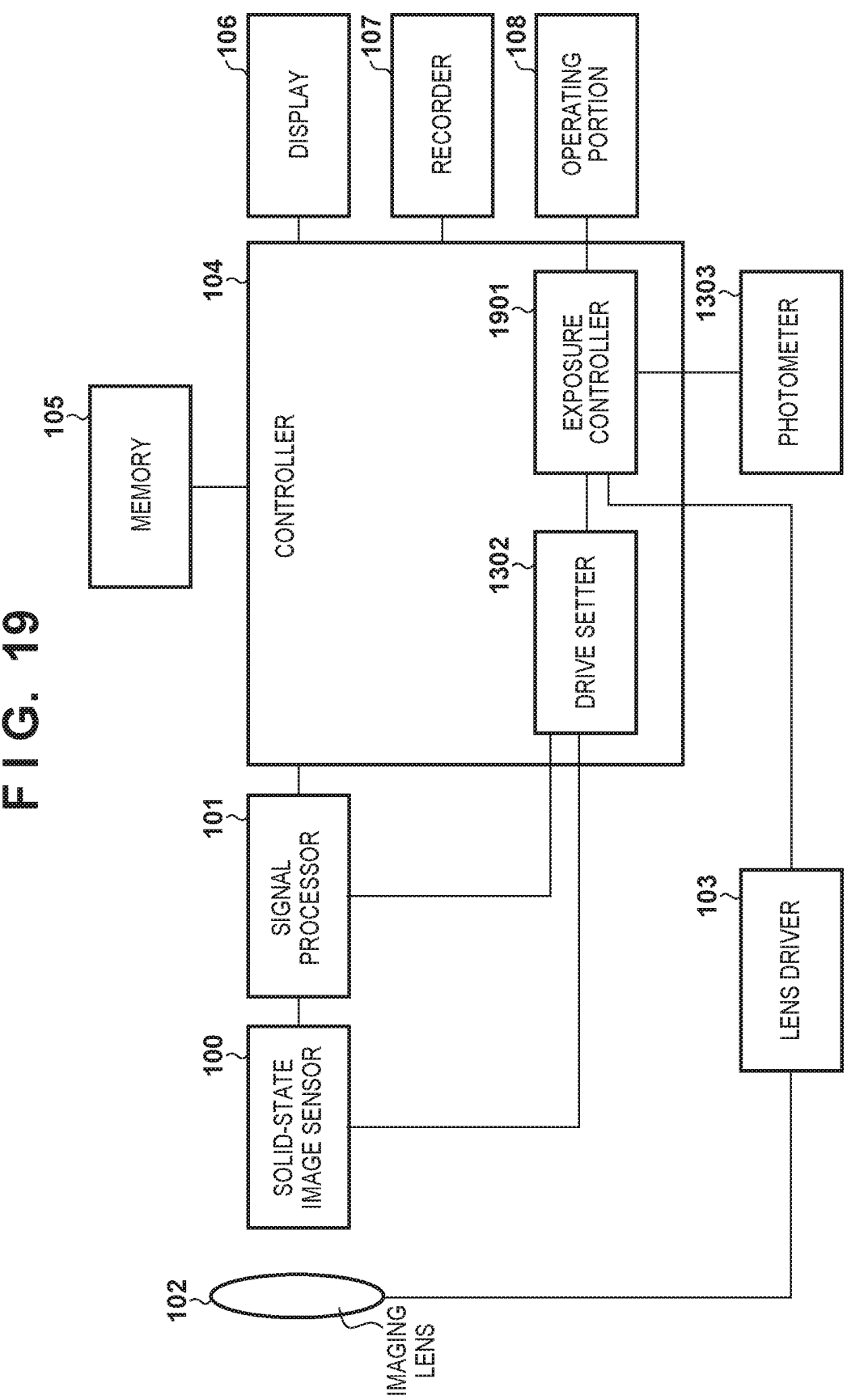
FIG. 19 is a block diagram illustrating an image capturing apparatus according to a sixth embodiment.

FIG. 19 is a block diagram of the image capturing apparatus according to this embodiment. The image capturing apparatus illustrated in FIG. 19 has a configuration that differs from the configuration illustrated in FIG. 1 in that the image capturing apparatus according to this embodiment includes the photometer 1303, and the drive setter 1302 and an exposure controller 1901 are provided in the controller 104.

The exposure controller 1901 determines shooting conditions, such as exposure time, ISO sensitivity, and f-number of the imaging lens 102, based on photometric results from the photometer 1303, and transmits information regarding these shooting conditions to the drive setter 1302 and the lens driver 103. The exposure controller 1901 can also determine the shooting conditions such as exposure time, ISO sensitivity, and f-number, in accordance with a user operation that is made through the operating portion 108.

For example, information regarding the exposure time that has been set by the exposure controller 1901 is transmitted to the drive setter 1302, and control data for driving the solid-state image sensor 100 for the set exposure time is transmitted from the drive setter 1302 to the solid-state image sensor 100. Information regarding the ISO sensitivity that has been set by the exposure controller 1901 is transmitted to the drive setter 1302. Then, a control signal that corresponds to the ISO sensitivity is transmitted from the drive setter 1302 to the signal processor 101. Based on this control signal, the signal processor 101 multiplies the image data by a digital gain that corresponds to the ISO sensitivity. For example, with ISO 100, the signal processor 101 multiplies image data by a digital gain of ×1. With ISO 200, the signal processor 101 multiplies image data by a digital gain of ×2. Information regarding the f-number that has been set by the exposure controller 1901 is transmitted to the lens driver 103, and is used to control the aperture of the imaging lens 102.

Furthermore, the exposure controller 1901 determines whether to drive the solid-state image sensor 100 in a first driving mode for operating the saturation detector 205 or a second driving mode for disabling the operation of the saturation detector 205, based on the photometric results from the photometer 1303.

FIG. 20 is a flowchart illustrating a flow through which shooting is performed while switching between the first driving mode for operating the saturation detector 205 and the second driving mode for disabling the operation of the saturation detector 205, based on the photometric results from the photometer 1303.

Figure 15:
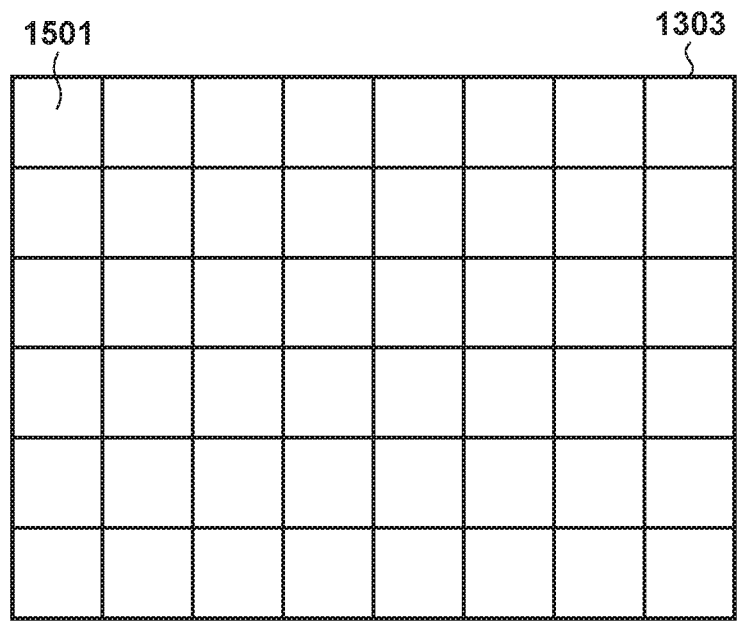
FIG. 15 illustrates an example of a photometric area for a photometer according to the fifth embodiment.

Initially, in step S2001, the photometer 1303 performs photometry, and measures subject luminance for each of the plurality of photometric areas 1501 shown in FIG. 15. The photometric results are transmitted to the exposure controller 1901.

In step S2002, the exposure controller 1901 determines shooting conditions such as exposure time, ISO sensitivity, and f-number, based on the photometric results. For example, based on the photometric results from the photometer 1303, the shooting conditions such as exposure time, ISO sensitivity, and f-number are set so that the average exposure amount over the entire image area is appropriate.

The exposure controller 1901 also determines whether to drive the solid-state image sensor 100 in the first driving mode or the second driving mode. For example, the first driving mode is selected if the exposure controller 1901 determines, based on the photometric results, that a high-luminance subject exists in an area, and the count values of some pixels will be saturated during the exposure period under the set shooting conditions. In other cases, the second driving mode is selected. Thus, based on the photometric results, the first driving mode is selected if a high-luminance subject exists (or under a high illuminance environment), and the second driving mode is selected if no high-luminance subject exists (or under a low illuminance environment).

In step S2002, the drive setter 1302 transmits a control signal for capturing an image to the solid-state image sensor 100 and the signal processor 101. At this time, the exposure controller 1901 transmits a control signal for driving the solid-state image sensor 100 in the selected driving mode to the solid-state image sensor 100.

In step S2003, the solid-state image sensor 100 is driven in either the first driving mode or the second driving mode to capture an image, based on the control signal transmitted from the drive setter 1302. This operation is the same as that in the first embodiment, and a description thereof is omitted accordingly. Image data output from the solid-state image sensor 100 is subjected to various kinds of correction processing by the signal processor 101, and is then transmitted to the controller 104.

As described above, according to this embodiment, based on the photometric results from the photometer 1303, shooting is performed in the first driving mode if a high-luminance subject exists (or under a high illuminance environment). Accordingly, the count values can be prevented from being saturated during an exposure period, and an image with favorable gradation can be obtained.

As another control method according to this embodiment, control may be performed to switch between the first driving mode and the second driving mode in accordance with any of the shooting conditions such as exposure time, ISO sensitivity, and f-number, without using the photometric results from the photometer 1303.

FIG. 21 is a flowchart illustrating a flow through which shooting is performed while switching between the first driving mode and the second driving mode in accordance with the shooting conditions that have been set by the user through the operating portion 108.

In step S2101, the user sets the shooting conditions such as exposure time, ISO sensitivity, and f-number, through the operating portion 108. Information regarding the set shooting conditions is transmitted to the exposure controller 1901.

In step S2102, the exposure controller 1901 determines whether to drive in the first driving mode or the second driving mode, based on the shooting conditions that have been set in step S2101. Here, for example, the first driving mode is selected if the ISO sensitivity is lower than a predetermined threshold, and the second driving mode is selected in other cases. By thus selecting the first driving mode when low ISO sensitivity is set, which is typically used under a high illuminance environment, the count values can be prevented from being saturated during an exposure period.

The determination method in step S2102 is not limited to one using ISO sensitivity. For example, a configuration may be employed in which, based on the f-number of the imaging lens 102, the first driving mode is selected if the f-number is larger than a threshold f-number, and the second driving mode is selected if the f-number is smaller than the threshold f-number. Alternatively, a configuration may be employed in which, based on the exposure time, the first driving mode is selected if the exposure time is longer than a threshold period of seconds, and the second driving mode is selected if the exposure period is shorter than a threshold period of seconds. Also, a configuration may be employed in which the first driving mode is used if at least one of the aforementioned shooting conditions corresponds to the first driving mode.

Operations in step S2103 and the subsequent step are the same as the operations in step S2003 and the subsequent step in FIG. 20, and a description thereof is omitted accordingly.

As yet another control method according to this embodiment, an example will now be described in which the present invention is applied to an image capturing apparatus that includes shooting modes that are a standard dynamic range (SDR) mode for outputting 14-bit image data from the solid-state image sensor 100 and a high dynamic range (HDR) mode for outputting 16-bit image data. In this embodiment, for example, the counter 306 shown in FIG. 3 has a bit width of 14 bits. During the SDR mode, the counter 306 operates in the second driving mode for disabling the operation of the saturation detector 205, and 14-bit image data is output from the solid-state image sensor 100. During the HDR mode, the counter 306 only has a bit width of 14 bits, but is operated in the first driving mode to acquire a count value and perform the reset operation every time the count value of the counter 306 reaches the threshold Cth. Therefore, 14-bit or higher gradation can be obtained. Accordingly, for example, 16-bit image data is output from the solid-state image sensor 100.

Figure 22:
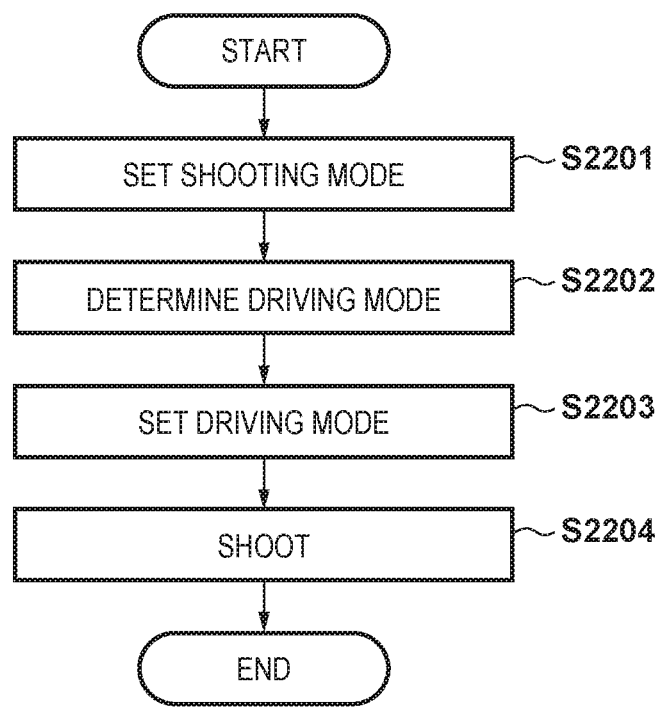
FIG. 22 is a flowchart illustrating a flow of yet another control of the image capturing apparatus according to the sixth embodiment.

FIG. 22 is a flowchart illustrating a flow through which shooting is performed while switching between the first driving mode and the second driving mode in accordance with the shooting mode (SDR mode, HDR mode) that has been set by the user through the operating portion 108.

In step S2201, the user sets a shooting mode (SDR mode, HDR mode) through the operating portion 108. Information regarding the set shooting conditions is transmitted to the exposure controller 1901.

In step S2202, the exposure controller 1901 determines whether drive is to be performed in the first driving mode or the second driving mode, based on the information regarding the shooting conditions. Here, for example, the second driving mode is selected during the SDR mode, and the first driving mode is selected during the HDR mode.

Operations in step S2203 and the subsequent step are the same as those in step S2003 and the subsequent step in FIG. 20, and a description thereof is omitted accordingly.

As a result of the above-described operation, by performing shooting in the first driving mode during the HDR mode, the count values can be prevented from being saturated during an exposure period, and an image with high gradation can be obtained.

Seventh Embodiment

An image capturing apparatus and a method for controlling the same according to the seventh embodiment will be described with reference to FIGS. 23 to 24. Note that the same constituent elements as those of the solid-state image sensor and so on according to the first to sixth embodiments in FIGS. 1 to 22 are assigned the same signs, and a description thereof is omitted or simplified.

Figure 23:
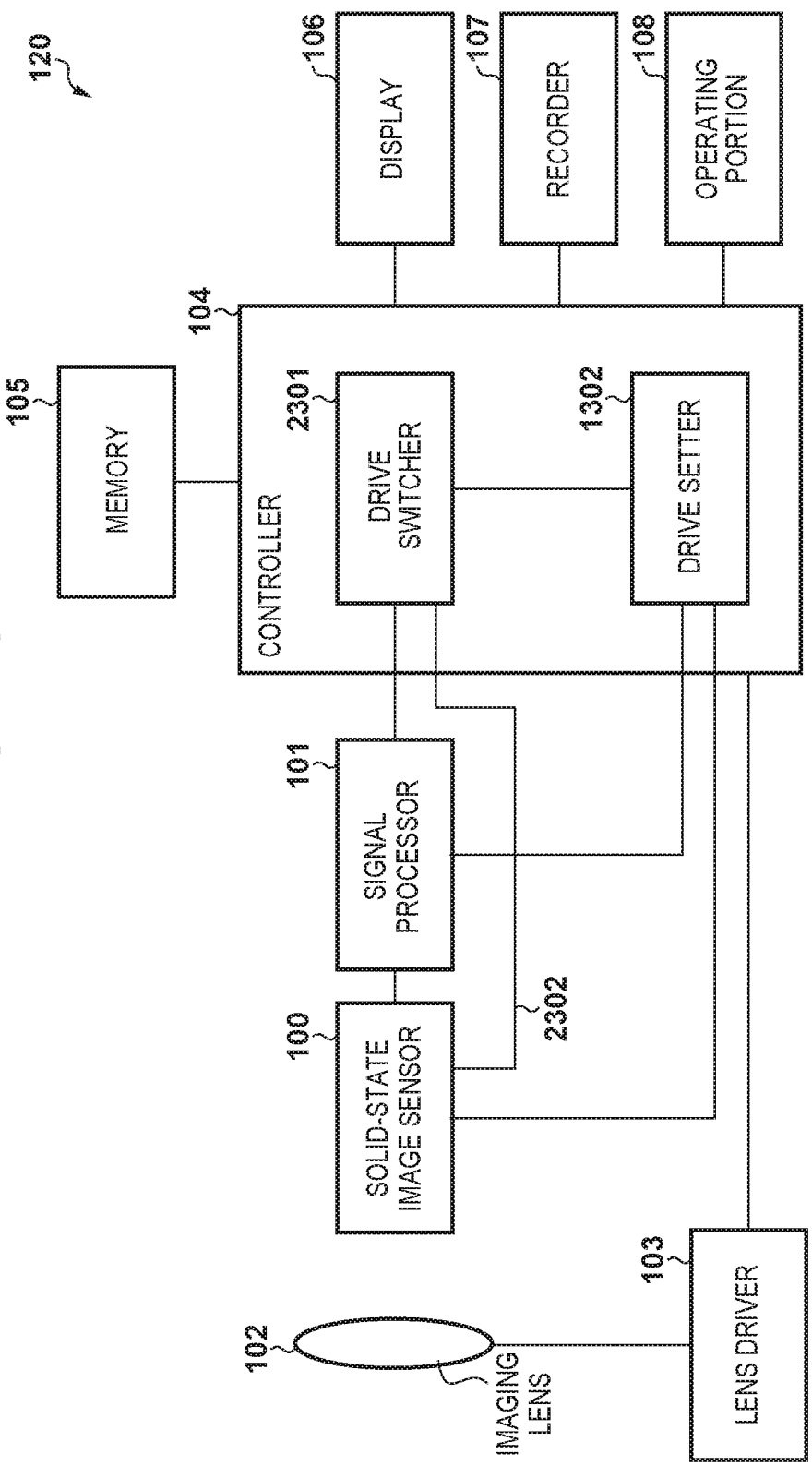
FIG. 23 is a block diagram illustrating an image capturing apparatus according to a seventh embodiment.

FIG. 23 is a block diagram of the image capturing apparatus according to this embodiment. The image capturing apparatus according to this embodiment illustrated in FIG. 23 has a configuration that differs from the configuration illustrated in FIG. 1 in that a drive switcher 2301 and the drive setter 1302 are provided in the controller 104.

The drive switcher 2301 receives, via the signal processor 101, image data that is output from the solid-state image sensor 100, and detects whether or not the image data includes a saturated pixel signal. Also, the drive switcher 2301 receives, via an interconnect 2302, a signal indicating that the threshold-reach signal PSAT output from the saturation detector 205 in FIG. 2 has been detected. Based on the signal indicating that the threshold-reach signal PSAT has been detected and the result of detecting whether or not the input image data includes a saturated pixel signal, the drive switcher 2301 determines whether to drive the solid-state image sensor 100 in the first driving mode or the second driving mode.

The drive setter 1302 transmits a control signal for capturing an image to the solid-state image sensor 100 and the signal processor 101. At this time, the drive switcher 2301 transmits a control signal for driving the solid-state image sensor 100 in the selected driving mode to the solid-state image sensor 100.

Figure 24:
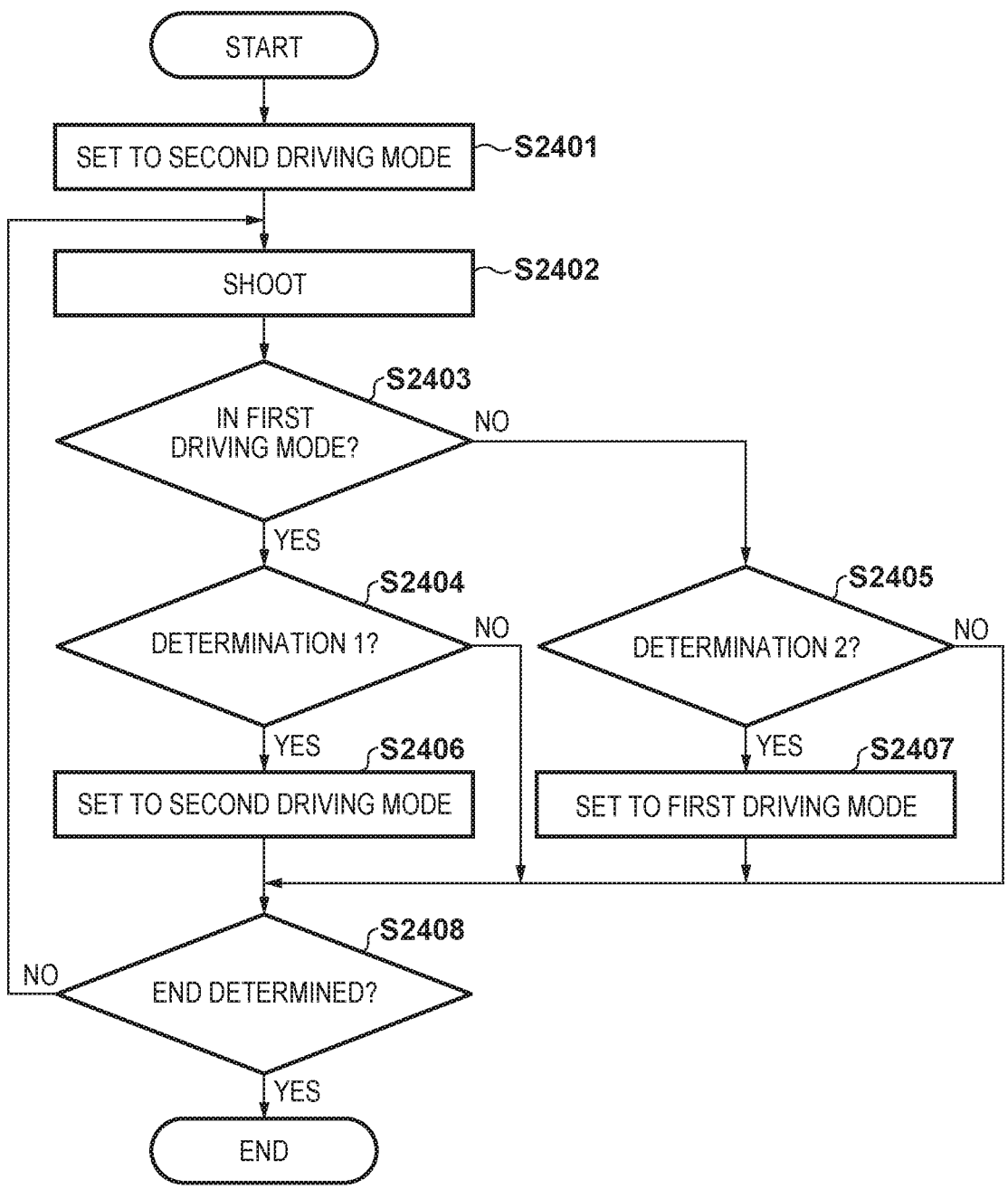
FIG. 24 is a flowchart illustrating a flow of control of the image capturing apparatus according to the seventh embodiment.

FIG. 24 is a flowchart illustrating a flow of control in the image capturing apparatus according to this embodiment. Upon shooting being started, in step S2401, the drive switcher 2301 selects the second driving mode, and information regarding the second driving mode is transmitted to the drive setter 1302. In step S2402, the drive setter 1302 transmits, to the solid-state image sensor 100, a control signal for driving the solid-state image sensor 100 in the driving mode selected by the drive switcher 2301. Then, the solid-state image sensor 100 performs shooting, and the shot image data is input to the drive switcher 2301 via the signal processor 101.

In step S2403, the drive switcher 2301 determines whether or not the shooting in step S2402 has been performed in the first driving mode. The processing proceeds to determination 1 in step S2404 in the case of the first driving mode, and proceeds to determination 2 in step S2405 in the case of the second driving mode.

In the determination 1 in step S2404, it is determined as to whether a signal indicating that the threshold-reach signal PSAT, which is input via the interconnect 2302 during the shooting in step S2402, has not been received. If the signal indicating that the threshold-reach signal PSAT has been detected has not been received (YES), the processing proceeds to step S2406, and the drive switcher 2301 selects the second driving mode. If the signal indicating that the threshold-reach signal PSAT has been detected has been received (NO), the processing proceeds to step S2408 without switching the driving mode.

On the other hand, in the determination 2 in step S2405, the drive switcher 2301 detects whether or not the image data that has been input via the signal processor 101 includes a saturated pixel signal. If a saturated pixel signal is included (YES), the processing proceeds to step S2407, and the drive switcher 2301 selects the first driving mode. If no saturated pixel signal is included (NO), the processing proceeds to step S2408 without switching the driving mode.

In step S2408, whether or not to continue shooting is determined, and for example, shooting ends if the user has made an operation to end shooting through the operating portion 108. If the shooting continues, the processing returns to step S2402, and shooting is performed in the driving mode that is currently selected by the drive switcher 2301.

By thus performing control, the driving mode can be switched to the first driving mode if an image that has been shot in the second driving mode includes a saturated pixel signal. Also, the driving mode can be switched to the second driving mode if a signal indicating that the threshold-reach signal PSAT has been detected is not received during the first driving mode.

As described above, according to this embodiment, the driving mode can be switched to the first driving mode if a shot image includes a saturated pixel signal. Accordingly, the count values can be prevented from being saturated during an exposure period, and an image with favorable gradation can be obtained.

Eighth Embodiment

An image capturing apparatus and a method for controlling the same according to the eighth embodiment will be described with reference to FIGS. 25 and 26. Note that the same constituent elements as those of the solid-state image sensor and so on according to the first to seventh embodiments in FIGS. 1 to 24 are assigned the same signs, and a description thereof is omitted or simplified.

Figure 25:
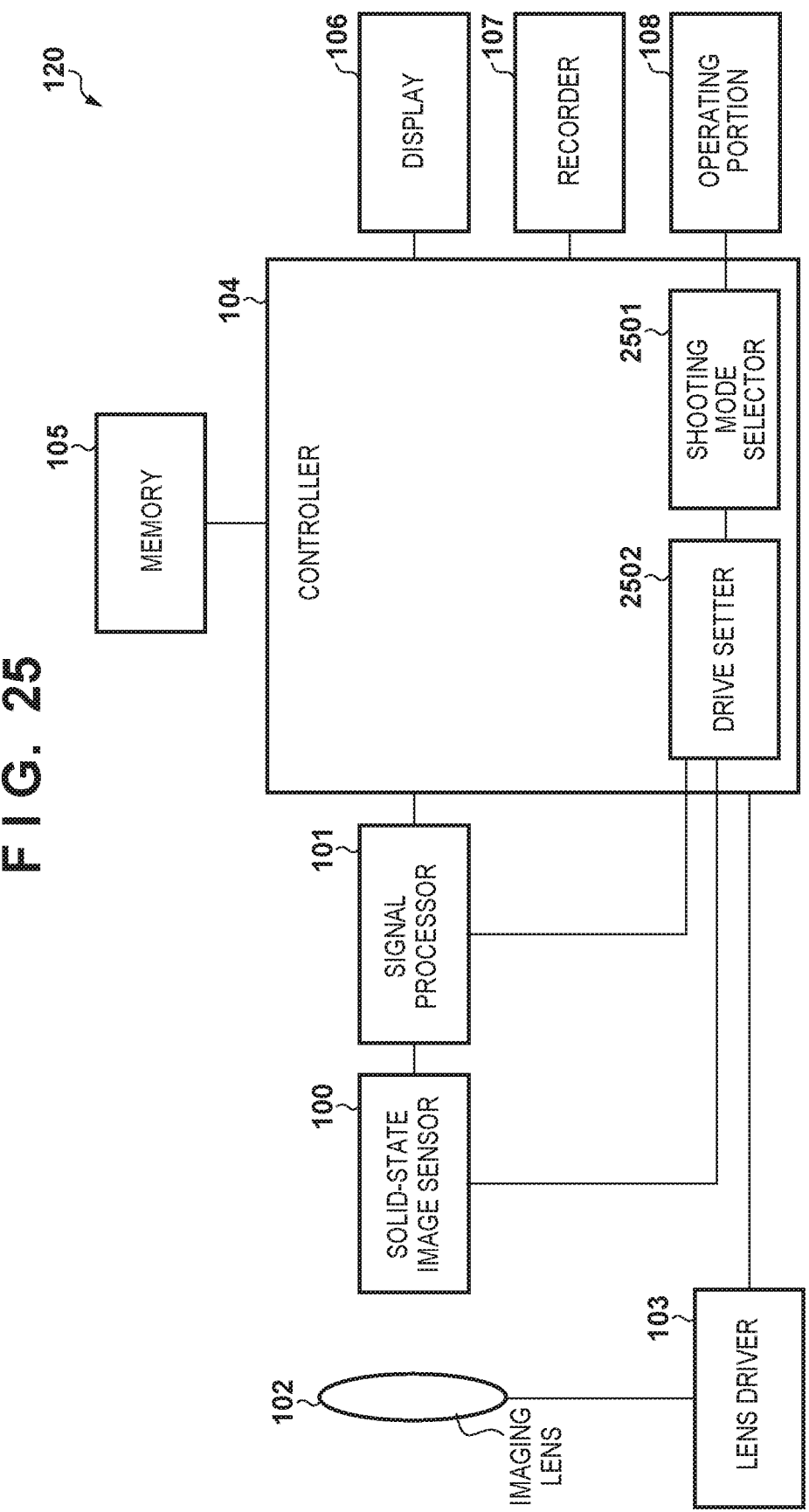
FIG. 25 is a block diagram illustrating an image capturing apparatus according to an eighth embodiment.

FIG. 25 is a block diagram of the image capturing apparatus according to this embodiment. The image capturing apparatus according to this embodiment illustrated in FIG. 25 has a configuration that differs from the configuration illustrated in FIG. 1 in that a shooting mode selector 2501 and a drive setter 2502 are provided in the controller 104.

The solid-state image sensor 100 according to this embodiment has the same configuration as the configuration of the solid-state image sensor according to the second embodiment illustrated in FIGS. 7 and 8, and is driven as illustrated in the timing chart in FIG. 9. The value of the threshold Cth for the counters 306 in the solid-state image sensor 100 according to this embodiment can be set by the drive setter 2502 in accordance with the shooting mode.

The shooting mode selector 2501 selects a shooting mode in accordance with a user operation that is made through the operating portion 108, for example, and transmits information regarding the selected shooting mode to the drive setter 2502. Examples of the shooting mode include an entire-screen readout mode for outputting the signals of all of the pixels in the pixel array 200, and a crop readout mode for outputting signals of some of the pixels in the pixel array 200.

The drive setter 2502 transmits a control signal for driving the solid-state image sensor 100 and the signal processor 101 in the shooting mode selected by the shooting mode selector 2501. The drive setter 2502 also transmits a control signal for setting the value of the threshold Cth for the counter 306 of each pixel in the solid-state image sensor 100, in accordance with the shooting mode selected by the shooting mode selector 2501. Here, the value of the threshold Cth set by the drive setter 2502 is the value indicated by Expression (2) in the second embodiment, for example. In Expression (2), n, which denotes the readout row number, and T1h, which denotes the time required to transfer pixel signals for one row to the frame memory 206, take values that correspond to the shooting mode, such as the entire-screen readout mode or the crop readout mode.

Figure 26:
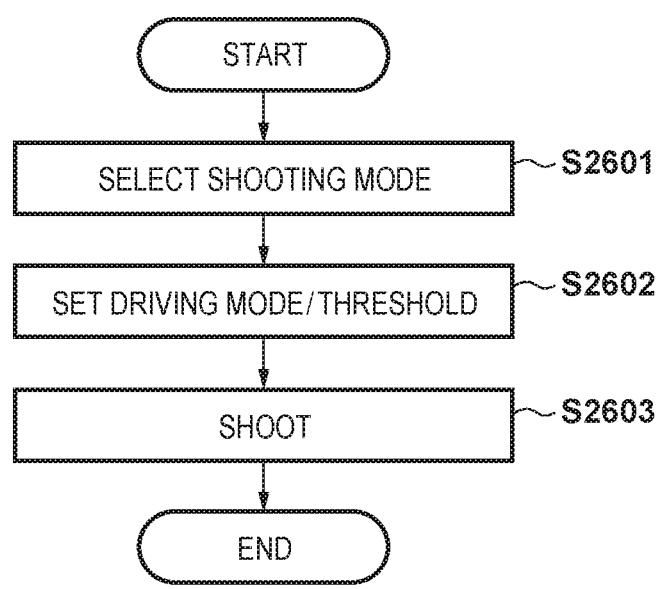
FIG. 26 is a flowchart illustrating a flow of control of the image capturing apparatus according to the eighth embodiment.

FIG. 26 is a flowchart illustrating a flow through which shooting is performed while setting the threshold Cth in accordance with the shooting mode (entire-screen readout mode, crop readout mode) that has been set by the user through the operating portion 108.

In step S2601, the shooting mode selector 2501 selects the shooting mode (entire-screen readout mode, crop readout mode) in accordance with, for example, a user operation made through the operating portion 108. Information regarding the selected shooting mode is transmitted to the drive setter 2502.

In step S2602, the drive setter 2502 transmits a control signal for driving in the selected shooting mode to the solid-state image sensor 100 and the signal processor 101. The drive setter 2502 also transmits, to the solid-state image sensor 100, a control signal for setting the value of the threshold Cth for the counter 306 of each pixel in the solid-state image sensor 100, in accordance with the shooting mode selected by the shooting mode selector 2501.

In step S2603, the solid-state image sensor 100 performs shooting in the shooting mode selected in step S2601. At this time, a value that corresponds to the shooting mode selected in step S2601 is used as the threshold Cth for the counter 306.

As a result of the above-described operation, the image capturing apparatus according to this embodiment can change the threshold Cth for the counters 306 in accordance with the shooting mode. Also, in this embodiment as well, the count values can be prevented from being saturated during an exposure period, and an image with favorable gradation can be obtained, similarly to the second embodiment.

Although the embodiments of the present invention have been described so far, the present invention is not limited to these embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-235207, filed on Dec. 7, 2017, and No. 2018-167213, filed on Sep. 6, 2018, which are hereby incorporated by reference herein in their entirety.

What is claimed is:

1. An image sensor comprising:
a plurality of pixels each including a sensor portion that generates pulses at a frequency corresponding to a frequency at which photons are incident and a counter that counts a number of pulses generated by the sensor portion;
a detector that detects whether or not a count value obtained by the counter that is provided in one of the plurality of pixels has reached a first threshold; and
an addition circuit that performs addition of signals which are based on the count values for each of the pixels in a case where the detector detects that the count value obtained by the counter that is provided in the one of the plurality of pixels has reached the first threshold.

2. The image sensor according to claim 1,
wherein the counter provided in each of the plurality of pixels is reset in a case where the detector detects that the count value obtained by the counter that is provided in the one of the plurality of pixels has reached the first threshold.

3. The image sensor according to claim 1, further comprising:
a memory that holds, for each of the plurality of pixels, the count values obtained by the counter,
wherein each counter is reset after its count value is held in the memory.

4. The image sensor according to claim 3,
wherein the memory is provided in each of the pixels.

5. The image sensor according to claim 1, further comprising:
a memory that sequentially selects a count value from the count values obtained by the counters and hold the sequentially selected count values for the respective sensor portions, the memory being provided outside the pixels,
wherein each counter is reset after its count value is read out.

6. The image sensor according to claim 1,
wherein each of the plurality of pixels comprises:
the detector;
a memory that holds a count value obtained by the counter; and
the addition circuit.

7. The image sensor according to claim 1, further comprising:
an output prevention circuit that prevents, based on the result of the detection performed by the detector, output of a signal indicating that a count value obtained by the counter provided in a predetermined pixel, of the plurality of pixels, has reached the first threshold.

8. The image sensor according to claim 1, further comprising:
an output prevention circuit that prevents output of a pulse from the sensor portion provided in a predetermined pixel, of the plurality of pixels.

9. The image sensor according to claim 7,
wherein the predetermined pixel is a defective pixel.

10. The image sensor according to claim 1,
wherein the detector ignores the count value obtained by the counter having reached the first threshold, with respect to a predetermined pixel, of the plurality of pixels.

11. The image sensor according to claim 10, further comprising:
a photometer,
wherein the predetermined pixel is a pixel that corresponds to a subject having a luminance that is greater than or equal to a second threshold, as a result of photometry performed by the photometer.

12. The image sensor according to claim 10, further comprising:
an operating portion,
wherein the predetermined pixel is a pixel selected by the operating portion.

13. The image sensor according to claim 1,
wherein the image sensor can operate in a first mode in which the detection is performed by the detector, and a second mode in which the detection is not performed by the detector.

14. The image sensor according to claim 13, further comprising:
a photometer,
wherein, as a result of photometry performed by the photometer, the image sensor operates in the first mode if a subject having a luminance that is greater than or equal to a third threshold exists, and operates in the second mode if a subject having a luminance that is greater than or equal to the third threshold does not exist.

15. The image sensor according to claim 13, further comprising:
a setter that sets a shooting condition,
wherein whether the image sensor operates in the first mode or the second mode is switched based on the shooting condition set by the setter.

16. The image sensor according to claim 13,
wherein if the image sensor is operating in the first mode and it has not been detected by the detector that the count value has reached the first threshold, the first mode is switched to the second mode, and if the image sensor is operating in the second mode and a count value that is greater than or equal to a third threshold is included in count values obtained by the counters, the second mode is switched to the first mode.

17. The image sensor according to claim 1, further comprising:
a selector that selects one of a plurality of different shooting modes,
wherein the first threshold is changed in accordance with the shooting mode selected by the selector.

18. The image sensor according to claim 1,
wherein the sensor portion includes an avalanche photodiode.

19. An image capturing apparatus comprising:
an image sensor comprising: a plurality of pixels each including a sensor portion that generates pulses at a frequency corresponding to a frequency at which photons are incident and a counter that counts a number of pulses generated by the sensor portion; a detector that detects whether or not a count value obtained by the counter that is provided in one of the plurality of pixels has reached a first threshold; and an addition circuit that performs addition of signals which are based on the count values for each of the pixels in a case where the detector detects that the count value obtained by the counter that is provided in the one of the plurality of pixels has reached the first threshold; and
a processor that performs predetermined processing on a signal output from the image sensor.

20. An image capturing method comprising:
counting, using a counter, a number of pulses generated by a sensor provided in each of a plurality of pixels at a frequency corresponding to a frequency at which photons are incident;
detecting whether or not a count value obtained by the counter that is provided in one of the plurality of pixels has reached a first threshold; and
performing addition of signals which are based on the count values for each of the pixels in a case where it is detected that the count value obtained by the counter that is provided in the one of the plurality of pixels has reached the first threshold.

* * * * *